(12) United States Patent
Hsu

(10) Patent No.: US 7,526,539 B1
(45) Date of Patent: Apr. 28, 2009

(54) METHOD AND APPARATUS FOR A DISTRIBUTED HOME-AUTOMATION-CONTROL (HAC) WINDOW

(75) Inventor: George Hsu, Santa Rosa, CA (US)

(73) Assignee: PNI Corporation, Santa Rosa, CA (US)

( * ) Notice: Subject to any disclaimer, the term of this patent is extended or adjusted under 35 U.S.C. 154(b) by 449 days.

(21) Appl. No.: 09/633,801

(22) Filed: Aug. 7, 2000

Related U.S. Application Data

(63) Continuation-in-part of application No. 09/569,746, filed on May 11, 2000, now Pat. No. 6,374,079, which is a continuation-in-part of application No. 09/477,226, filed on Jan. 4, 2000, now abandoned.

(51) Int. Cl.
*G06F 15/16* (2006.01)

(52) U.S. Cl. .................. 709/223; 709/203; 709/224; 709/217

(58) Field of Classification Search .............. 709/104, 709/185, 218, 220, 224, 223, 217, 219, 203; 707/185; 700/17; 345/335

See application file for complete search history.

(56) References Cited

U.S. PATENT DOCUMENTS

| | | | |
|---|---|---|---|
| 5,051,720 A | 9/1991 | Kittirutsunetorn | |
| 5,805,442 A | 9/1998 | Crater et al. | |
| 6,061,603 A | 5/2000 | Papadopoulos et al. | |
| 6,138,150 A * | 10/2000 | Nichols et al. | 709/219 |
| 6,192,282 B1 * | 2/2001 | Smith et al. | 700/19 |
| 6,243,707 B1 * | 6/2001 | Humpleman et al. | 707/102 |
| 6,327,628 B1 * | 12/2001 | Anuff et al. | 709/311 |
| 6,362,783 B1 * | 3/2002 | Sugiura et al. | 342/457 |
| 6,580,950 B1 * | 6/2003 | Johnson et al. | 700/17 |
| 6,604,075 B1 * | 8/2003 | Brown et al. | 704/270.1 |
| 6,826,607 B1 * | 11/2004 | Gelvin et al. | 709/224 |
| 7,213,061 B1 * | 5/2007 | Hite et al. | 709/223 |
| 2002/0007229 A1 * | 1/2002 | Hudson et al. | 700/245 |
| 2003/0009537 A1 * | 1/2003 | Wang | 709/219 |

* cited by examiner

*Primary Examiner*—William C Vaughn, Jr.
*Assistant Examiner*—Djenane M Bayard
(74) *Attorney, Agent, or Firm*—Fernandez & Associates, LLP

(57) ABSTRACT

A software-control-module for enabling a user to monitor and control home-automated-systems and appliances from one or more remote interfaces on a data-packet-network is provided. The module comprises a reporting function for reporting current status of the home-automated-systems and appliances; a selection function for selecting options related to system and appliance settings; a command-building function for building commands for system and appliance control; an execution function for executing commands; and a display function for displaying relevant data and for facilitating interactive control ability. the software-control module is distributed to pre-selected network locations frequented by a user such that the user may have control over home-automated systems and appliances while visiting the network location during network navigation.

14 Claims, 15 Drawing Sheets

User Premise 900Mhz Spread Spectrum

MI Magnetic Induction (configuring)

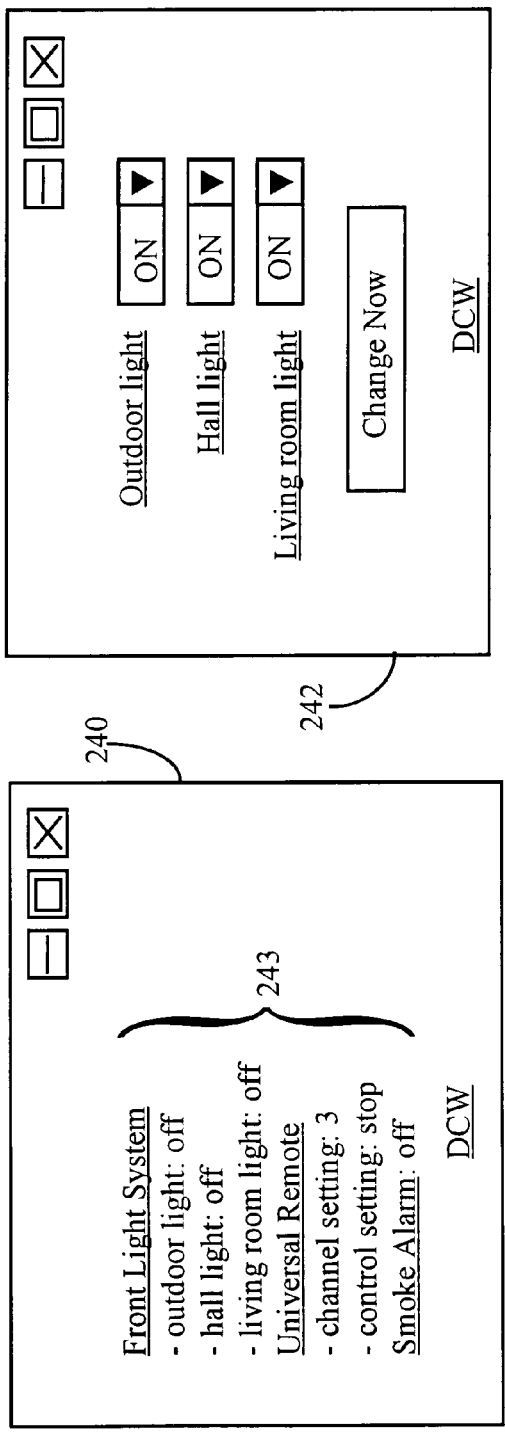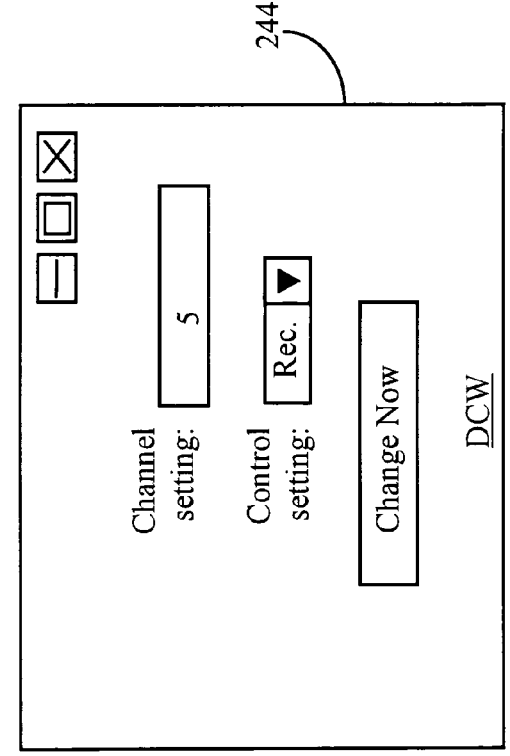
Fig. 13A
Fig. 13B
Fig. 13C

US 7,526,539 B1

METHOD AND APPARATUS FOR A DISTRIBUTED HOME-AUTOMATION-CONTROL (HAC) WINDOW

CROSS-REFERENCE TO RELATED DOCUMENTS

The present invention is a continuation-in-part (CIP) to a U.S. patent application Ser. No. 09/569,746 entitled "A Modular RF Communication Module for Automated Home and Vehicle Systems" filed on May 11, 2000, now U.S. Pat. No. 6,374,079, which is a CIP to a patent application Ser. No. 09/477,226 "A Home and Vehicular Automation and Control-Driven Web Portal" filed on Jan. 4, 2000, now abandoned disclosures of which are included herein in their entirety by reference.

FIELD OF THE INVENTION

The present invention is in the field of automated home and vehicle control systems and pertains more particularly to of methods and apparatus for providing a distributable user-control window such that a user may interface and control aspects of a HAC system from within frequently visited portal sites or from a variety of home pages on a data-packet-network.

BACKGROUND OF THE INVENTION

The field of creating successful and sustainable web-portals has become exponentially more competitive and difficult by each passing month as thousands of new web-based business ideas are launched each week. Truly useful services and ideas are becoming increasingly difficult to find and, furthermore, to sustain in such a competitive environment. Typically such portals include search engines, travel services, lifestyle content providers, news services, retailers, and the like whose business revolves around a pure software and service model. Very few of these commercial web-sites involve hardware, and none are designed to standardize the deployment and control of every single piece of home or vehicle-based automation and sensor hardware now in existence or that will be coming into existence produced by any manufacturer and based upon any standard.

There are only very few web sites that allow a consumer to control a very limited number of home automation devices, and such web-sites, which are not built entirely from scratch by those few capable consumers who are skilled enough in the art to do so on their own, simply exist in order to assist in the sales of their specific and proprietary home automation devices.

The present invention provides a way for consumers to extend the functionality of new and existing home automation devices and systems, and provides a common look and feel to all these such disparate devices and systems, allowing consumers with very little skill in the art to easily compare, choose, purchase and control such automation devices with a single and very accessible user experience.

In embodiments of the new invention, once a user learns how to program a home watering system using the web site's interface, that same user will be able to program a VCR in almost exactly the same syntax and fashion. The web site provided in the preferred embodiment of the new invention employs a natural-language programming interface that is driven by limited and non-confusing selections from drop down menus that will reconfigure themselves based upon the user's previous drop down menu selections. Other features to the preferred embodiment of this web site include a Virtual Device Applications Builder, which allows the user to input his desired home automation goals, and will then allow him to manipulate, test and view the resulting system in exactly the same way he would a real system. Once the user is satisfied with the virtual configuration of his devices, the web-site provides a laundry list of specific hardware choices, from any and all available devices and manufacturers, and allows the user to purchase this list of items on-line. Moreover, once purchased, the web instructs the user in the configuration and installation of the devices, and ultimately allows the user to control this system via the Internet on this preferred embodiment of the web site. This web site additionally offers objective third-party editorial content evaluating the strengths and weaknesses of competing devices and standards that the users of the site could use in making their selection of systems and hardware.

The opportunity for this invention arise from a combination of the rapid rise and deployment of the Internet's infrastructure in general, and specifically that the home automation market, in the inventor's opinion, is much too fragmented for any single hardware manufacturer to dominate and become the de facto standard in the home automation market. The field of home sensor/actuator-controlled home systems has become more complex and sophisticated as electronic hardware also becomes more complex and sophisticated.

Systems provided for home installation and use include alarm systems, watering systems, lighting systems, heating and air conditioning systems, pool systems, and so on. Of these systems, there are varying degrees of automation and programmability features that are built in to each separate system in the current state of the art, and in a variety of wiring, communication, and control standards and protocols. For example, an automated and programmable watering system may have an electronic control box that is wired to each distributed actuator that controls distributed watering components. Such a box may use a programmable timer function to control how often and what areas covered by the physical components of the system will be watered. A client or user will typically set-up each part of the system to actuate at specific times for a specific length of time as is well known in the art.

The above example represents an actuator-control system. In some more advanced watering systems, a rain sensor may be provided and integrated to such a system so that watering may be temporarily discontinued or reduced such as during periods of extended rain. The rain sensor, picking up precipitation, would override the actuator and shut down watering until the next timed watering interval.

An example of a sensor-control system would be an alarm system. An alarm system responds to signals from sensors distributed within an area the system is designed to protect. Types of sensor capability used in an alarm system may vary widely from system to system. Some use photoelectric beams. Others use laser technology. Still others use movement and/or audio detectors or physical circuits, which when broken, trigger the alarm. There are many methods as is well understood by the skilled artisan.

In typical prior art implementation, a sensor and/or actuator-control system of the types described above are made available to consumers by usually separate enterprises, which provide all of the hardware and wiring necessary for function of such systems. Each system will have a control box provided and adapted to allow a home or business owner to program and implement any functions provided by the system. If a user has more than one type of system installed then he or she will have more than one control box to program and use. In typical prior art systems each control box must be programmed on-site and changed on-site if different settings are desired.

More recently, with the advent of powerful home computers, many companies that provide home automated systems have provided means including software, whereby a user may program a system from his or her personal home computer. In this way, a user is not required to physically interface with a control box in order to make changes to a system. In these types of systems a cable, such as a serial cable, is provided from a control box to a PC. By utilizing a software program, a user may send commands to the control box (adapted to receive serial commands) associated with a system such that programming and monitoring may be conducted from the PC.

With the advent of the well-known Internet network, some companies have provided a means to control home systems from a remote computer using the Internet as a conduit, and a home computer as a host. In this way a user may make changes and control home-system function from the office or from a mobile computer such as a Laptop computer. In some cases, this is accomplished through a company hosted website, which typically only supports this proprietary hardware standard and is intended to help increase sales of the hardware, but is not intended to be a web-portal through which a user can control and monitor home systems. In other cases, the method used is direct computer-to-computer linking.

Although companies that provide home automation systems have been moving toward remote access for controlling such systems, such companies typically provide only access to proprietary system components, which allow control to only those systems set-up for a user by the company. For example, if a user has a remote-access alarm system, and a remote-access heating and air conditioning system, then there will be two separate methods and apparatus for enabling control and monitoring of such systems.

In a more recent development, known in the art and to the inventor, some companies, realizing the potential for attracting business from Internet users, have developed computerized home systems that may be customized for individuals having a variety of home automation needs. For example, a user may desire a remote access system by which he or she can control an air conditioning and heating system, an alarm system, a watering system, and a lighting system, all from a single interface. Such systems are termed "smart home systems" to those who are familiar with this newer art.

The above-described smart systems require a powerful computer control station having ports and cables leading to distributed components of each integrated component system. Each separate component system such as a watering system, a heating/air system, an alarm system, a door locking/unlocking system, and so on, must be integrated with components that are capable of communicating with a central computer unit by way of cable. Such systems are quite expensive and therefore usually are above the affordable range of an average homeowner. Such smart systems are generally installed when new homes are being built, and are advertised as features of such homes. Because of extensive cabling, equipment requirements and labor needed to cosmetically install such smart systems in a home, such systems are not practical to an average homeowner.

A system known to the inventor and taught in an application identified under the Cross-Reference section above provides remote controllability for automated systems and appliances that may be distributed throughout a subscriber's home and or business. Control units built into or connected to each system and appliance to be controlled have each a microcontroller, system memory, I/O and wiring interface to individual ones of the systems and appliances, and an RF section for communication with a base station at the home or business. The base station is Internet-access-capable and has an RF section to communicate with the control units. In this system a subscriber can monitor and control the home or business systems and appliances from any Internet-capable device in any location. Functions entered in a web page interface by a subscriber are sent to the appropriate base station and thence to the appropriate control unit. In a further embodiment a subscriber can create a virtual system, then purchase parts through the service and rely on the service to provide installation and debugging aid, after which the newly-installed system may be accessed through the Internet.

RF communication provides a flexible method of communication between deployed devices wired to systems or appliances distributed in a user's home or business and a centralized base-station. It has occurred to the inventor, that while RF technology is a logical choice for implementation in the above-described system, typical RF implementation is accompanied by several drawbacks. For example an RF-based network must be regulated. Interference range must be calculated, and a degree of difficulty exists with implementation and tuning of a plurality of RF modules in a production environment. Certain consortium-launched RF standards such as Bluetooth or HomeRF may help to solve certain technical problems, however, further innovation is needed to provide an effective, low-cost, communication system and protocol.

The system mentioned above as taught in a cross-referenced application has a RF communication module for enabling RF data communication in a wireless communication system. The communication module comprises a transmitter/receive circuitry for transmitting and receiving data, a RF chipset and microcontroller for enabling and controlling various functions of the RF communication module, an antennae circuitry for enabling function of the transmitter/receive circuitry and a data port for enabling serial communication between the RF module and connected components of a host device. In this system, the RF module is characterized in that it may function, in certain aspects, as a slave module or a controlling module dependent on the host device.

It has occurred to the inventor that a Home Automation Control (HAC) system with extensible control capability that is WEB-based, wherein a central server allows patrons to configure, purchase, test, and monitor their systems from remote locations may be enhanced even further to allow patrons to control certain aspects of their systems from more than just one WEB interface. A user with several home pages that spends a significant amount of time on the Internet, for example, may desire to make a change in his or her HAC setting panel without having to access a central server at one address in order to initiate settings changes or to check on system status.

Therefore, what is clearly needed is a distributable status-report and control interface that may be invoked and executed from any number of a patron's home pages or subscribed portals. Such a distributed interface would enable a user to make alterations to his or her HAC system while actively engaged in interaction with any one of a number of frequently visited locations on the network.

SUMMARY OF THE INVENTION

In a preferred embodiment of the present invention, a software-control-module for enabling a user to monitor and control home-automated-systems and appliances from a remote interface on a data-packet-network is provided. The module comprises a reporting function for reporting current status of the home-automated-systems and appliances; a selection function for selecting options related to system and appliance settings; a command-building function for building commands for system and appliance control; an execution function for executing commands; and a display function for displaying relevant data and for facilitating interactive control ability. The software-control module is distributed to preselected network locations frequented by a user such that the user may have control over home-automated systems and appliances while visiting the network location during network navigation.

In a preferred embodiment of the present invention, the data-packet-network is the Internet network and the remote interface is an interactive information page of a Web site. In a preferred embodiment, the software control-module is distributed to and embedded within the interactive information page. In one embodiment, the software control-module is a Java-based module. In other embodiments, other Internet-based languages may be used to create the module. In some embodiments, the command-building function and the command-execution function of the software control-module are voice-activated functions.

In another aspect of the present invention, a control system for controlling home-automated-systems and appliances from within a remote interface on a data-packet-network is provided. The system comprises, a first server node connected to the network; a data repository accessible to the first server node for storing and managing data; a second server node connected to the network; an electronic information page hosted by the second server node and a software control-module. The electronic information page hosted by the second server node, is such that a user visiting the second server node and viewing the electronic information page may interact with the software control-module provided within the information page for the purpose of monitoring the home-automated-systems and appliances and communicating commands and settings changes to the first server node for transmission over the network to control apparatus associated with the systems and appliances.

In a preferred aspect, the system is implemented on the Internet network and the software control-module is a Java-based module. In preferred application, the software control-module is distributed from the first server to more than one secondary server and embedded in more than one electronic information page hosted within the secondary servers. At a minimum, the control module is distributed from the first server to a second server and embedded in an electronic information page hosted by the second server.

In one aspect, the software control-module is voice-activated for building commands and changing settings. In other aspects, the software control-module is manipulated by mouse click and keyboard function. In some embodiments a combination of mouse click, keyboard function, and voice activation may be used in interaction with the software control-module.

According to another aspect, a method for controlling home-automated-systems and appliances from a remote interface on a data-packet-network is provided. The method comprises the steps of (a) navigating on the data-packet-network to the remote interface; (b) activating an interactive control-window within the remote interface; (c) selecting desired options presented within the interactive control-window; (d) depending on the selected options, changing settings and creating commands and (e) executing the new settings and created commands.

In a preferred embodiment, the method is practiced on the Internet network and navigation is performed with a network browser application. In preferred embodiments, the remote interface is an electronic information page. In one aspect, steps (c), (d), and (e) are accomplished through voice activation. In another aspect steps (c), (d), and (e) are accomplished by mouse click and keyboard function. In still other aspects, a combination may be used.

Now, for the first time a distributable status-report and control interface that may be invoked and executed from any number of a patron's home pages or subscribed portal interfaces is provided. Such a distributed interface enables a user to make alterations to his or her HAC systems and appliances while actively engaged in interaction with any one of a number of frequently visited locations on the network.

BRIEF DESCRIPTION OF THE DRAWING FIGURES

FIG. 13A is a view of a first display of a distributed control window of FIG. 12 according to an embodiment of the present invention.

FIG. 13B is a plan view of a secondary display related to a state of the distributed control window of FIG. 13A.

FIG. 13C is a plan view of a secondary display related to another state of the distributed control window of FIG. 13A.

DESCRIPTION OF THE PREFERRED EMBODIMENTS

According to a preferred embodiment of the present invention, a method and apparatus, including software, is provided and adapted to facilitate automation of various home function systems and/or appliances such that communication to and from such devices and systems may be facilitated from a remote location using a wide area network (WAN) such as the Internet as a conduit. The methods and apparatus of the present invention are provided in enabling detail below.

Figure 1:
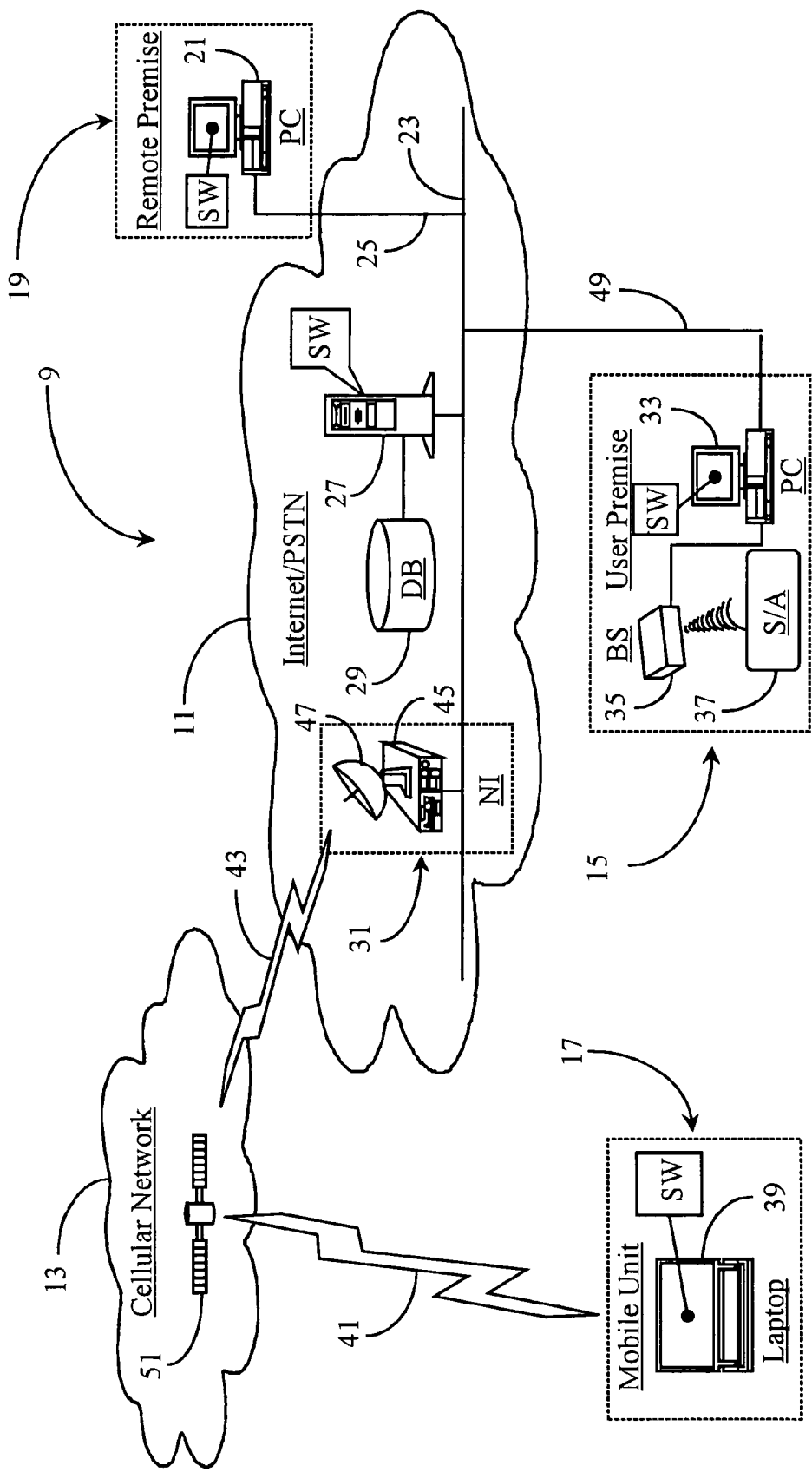
FIG. 1 is an overview of a communication network adapted to facilitate remote configuring and monitoring of automated home-systems and appliances according to an embodiment of the present invention.

FIG. 1 is an overview of a communication network and architecture system 9 adapted to facilitate remote configuring and monitoring of automated home-systems and appliances according to an embodiment of the present invention. System 9 comprises the Internet and public-switched-telephone-network (PSTN) represented herein by a network cloud 11, a cellular telephony network represented by a network cloud 13, a user premise 15, a remote premise 19, and a mobile unit 17.

Network 11, in this example, represents both a switched-packet-data-network (SPDN) such as the well-known Internet network and a telephony network such as the well-known PSTN network. The inventor chooses to represent both networks in this manner because of the ambiguity related to both networks as they often use the same equipment and infrastructure. Network 11 may be a combination of the Internet and a private telephony network, a private WAN and the PSTN network, or any combination. The network representation is also intended to include such as high speed broadband fiber optic networks and wireless implementations. In a preferred embodiment, the Internet and the PSTN are represented because of their large public access capabilities.

Network 11 considered as the Internet may be assumed to contain all of the equipment lines and connections that are known to exist in such a network. Network 11 as the PSTN may be assumed to contain all of the equipment, lines, and connections known to exist in such a network. Various equipment found in both networks such as computer nodes, IP routers, telephony switches, telephony routers, service provider stations (Internet or telephony), and the like are presumed known in the art and therefore are not described in detail herein. Cloud 11 will hereinafter be designated as Internet 11 or PSTN 11 when referring to either network.

User premise 15 is illustrated as connected to an Internet backbone 23, which represents the lines, equipment, and connection points making up the Internet network. Premise 15 represents a user's home or business having various automated and functional systems or appliances (not shown) installed therein or thereabout. Premise 15 is connected to backbone 23 by way of an Internet connection line 49. Internet connection line 49 may be one of many types of known services such as integrated services digital network (ISDN), digital subscriber line (DSL), standard plain old telephone service (POTS) line with modem, cable modem, wireless link, and so on. In one embodiment line 49 may be a continuous connection.

A personal Computer PC 33 is provided within premise 15 and is adapted for normal computer operation and Internet access capability as is known in the art. PC 33 acts, in this example, as an Internet host computer to a peripheral base station (BS) 35, which is provided and adapted according to an embodiment of the present invention, to communicate using radio frequency (RF) technology with at least one sensor/actuator device (S/A) 37. S/A 37 is provided and adapted, according to an embodiment of the present invention, to facilitate control and monitoring of an associated home-system or appliance. S/A 37, like BS 35 is adapted to communicate using RF technology.

Applicable RF communication technologies that may be used to practice the present invention may include but are not limited to Time-Division-Multiple-Access (TDMA), Frequency-Division-Multiple-Access (FDMA), Code-Division-Multiple-Access (CDMA) systems and so on. The RF technology employs a well-known spread-spectrum-technology (SST) to minimize interference and to enhance communication where there is no line of sight (LOS) between an S/A device such as S/A 37 and a BS such as BS 35.

BS 35 as well as S/A device 37 may be encased with durable lightweight materials such as polymeric materials typically used for such purpose. Materials used for encasing S/A device 37 may also be made water tight, or at least weather resistant for units placed outdoors where components require protection from the elements. Similar provisions may be made for BS 35. As such, BS 35 and S/A device 37 are designed to be lightweight and small enough to be easily handled and carried.

BS 35 is connected to PC 33 by a serial cable such as a USB or other older type known in the art, and functions as a peripheral as previously described. In one embodiment, Infrared or RF communication may be substituted for a serial cable connection. Also in one embodiment BS 35 may also have a telephone connection that functions as an Internet line from BS 35 directly to Internet 11. If only one phone line is available, then an RS connection is established between BS 35 and PC 33, which acts as a host computer. While there will only be one BS such as BS 35 within a user premise such as premise 15, there may be many S/A's such as S/A 37 resident within premise 15. An S/A such as S/A 37 is associated and connected to a home system or appliance for the purpose of allowing remote control over such systems or appliances through BS 35 and PC 33.

A remote premise 19 is illustrated as connected to backbone 23 in Internet 11 by an Internet connection path 25. Internet connection path 25 may be of a variety of known connection means as was described above with regard to line 49. Premise 19 represents such as a location remote from premise 15, perhaps an office workplace or other location where a user associated with premise 15 may keep a second PC such as PC 21 as represented herein. Therefore, a user associated premise 15 may travel to such as premise 19 and access PC 33, BS 35, and S/A 37 using Internet 11 as a conduit.

Mobile unit 17 represents a mobile state of a user such as one associated with premise 15 whereby a Laptop computer 39, or another mobile and wireless Internet-capable appliance may be used to access PC 33, BS 35, and S/A 37 at premise 15. In this example, Internet access is represented by a wireless satellite-connection 41 into cellular network 13 to a satellite 51 provided and adapted for relaying data via a wireless connection 43 to a network interface (NI) 31, and thus onto Internet network 11.

NI 31 comprises a processor 45, connected to backbone 23 and a satellite receiver/transceiver 47 adapted to receive and transmit in wireless mode. Such simple representation is intended to represent a wireless network interface known in the art for enabling wireless access to an Internet landline (backbone 23). Processor 45 is adapted as an entry point onto network 11 for wireless users having wireless Internet services as known in the art. In another embodiment, a user operating from a mobile unit such as unit 17 may, by using an Internet appliance such as Laptop 39, bypass Internet network 11 and achieve a cellular connection directly to BS 35 if desired and suitable according to enterprise rules and protocol.

A server 27 is provided within Internet 11 and adapted as a user interface for users to access their home systems or appliances through Internet 11 from such as premise 19 or mobile unit 17. Server 27 is hosted by a company providing a service of the present invention, hereinafter referred to simply as the service, which includes provision of customer premise equipment (CPE), as has already been introduced herein as BS 35 and S/A 37 within premise 15. Server 27 has a mass repository 29 connected thereto by data link, but which may be a part of server 27 or of another Internet-connected server. Repository 29 is adapted to store data about users subscribed to a service facilitated through server 27, as well as data regarding other parameters associated with S/A devices and BS stations. It is assumed that appropriate software is provided and adapted to allow efficient access to and manipulation of data stored in repository 29.

Instances of software (SW), which are provided and adapted in various capacities to facilitate practice of the present invention, are illustrated as executing at premise 15 on PC 33, at premise 19 on PC 21, at mobile unit 17 on Laptop 17, and on server 27 within Internet 11. SW residing on each of the Internet appliances, 39, 21, and 33 is provided in the form of a web browser plug-in application that allows users to access home systems and appliances through Internet 11. SW residing on server 27 functions to manage, through DB software interface, user accounts and information and data regarding client installations. SW residing on server 27 also functions in the capacity of web-server software allowing posting of stored data as well as received data, performing automated software and firmware updates, performing security procedures, and other user interaction processes. Firmware (not shown) for facilitating practice of the invention is provided in BS 35 and each of S/A's such as S/A 37.

The service of the present invention has several objectives. One is to provide users with S/A devices such as S/A device 37 and a base station such as BS 35. This equipment allows a user to modify existing home systems such as watering systems, video monitoring systems, heating and air systems, lighting systems, and the like such that they may be accessible and controllable from remote locations. Similarly, a user may, with the equipment of the present invention, modify singular or plural (like appliances) such as smoke alarms, gate locks, kitchen appliances, etc to be accessible and controllable from remote locations. Another objective of the service is to provide a means of notification to remote users in case of any emergency concerning any of a user's configured systems or appliances. Still another objective of the service is to provide a new and novel conduit through which manufacturers of home systems and appliances may advertise to consumers in a direct way.

The service of the present invention utilizes RF technology for communication between a BS such as BS 35 and a plurality of S/A devices such as device 37 as described above. In this way, automated systems may be conveniently configured and activated without using a mass cabling structure common to prior art systems described in the background section. In addition to existing home systems and appliances, which may be retrofitted with S/A devices according to embodiments of the present invention, new systems and appliances may be offered that are already equipped with S/A devices such as device 37.

In order to practice the present invention, a user powers on a system or appliance-compatible S/A device 37, and configures the device to BS 37. The inventor provides, in one embodiment, a magnetic induction system and procedure for enabling device configuration. The configuration procedure allows automatic device configuration by bringing the device close to BS 35 for purpose of initiating a magnetic induction data transfer, which is described in more detail later in this specification. In other embodiments RF, or other data transfer technique may be used. After an S/A device is configured, the user wires the configured S/A device 37 to his or her existing system or appliance. For example, one S/A device might be configured to a specific watering system whereas another S/A device might be configured to a specific lighting system, and so on. Each S/A device such as device 37 is enabled to communicate using one of the above-mentioned RF technologies to a central BS such as BS 35. The RF capability is bi-directional half-duplex in this example, however full duplex may also be supported in some embodiments.

S/A devices such as device 37 may be created for custom applications or provided for standard applications. Actual sensors and actuators used in such devices will vary somewhat on implementation. However, some standardization may be achieved in most instances.

Once an S/A device 37 is configured to a BS such as BS 35 and wired to a home system or appliance, a user may interact with the system or appliance from a remote location such as from premise 19, or from his or her own PC such as PC 33 in premise 15.

After configuration, a new S/A device is registered in repository 29 and becomes an added part of a user's overall portfolio of registered home-systems and appliances. If a user is operating from a remote premise such as, perhaps, premise 19, then he or she would log-on to Internet network 11 using a browser application executing on PC 21 and a suitable Internet connection means such as represented with line 25. Once on-line, server 27 is contacted and password is given to verify a user's authenticity. SW residing on PC 21, as a browser plug-in, enables automated navigation to and seamless interaction with SW running on server 27.

Once authenticated by the service, a user may then access a personalized hyper-text-markup (HTM) page that displays real-time status about all of his or her registered home-systems and appliances. For example, a user may see whether or not heating is active and what temperature is being observed with regard to a heating and air conditioning system. A user may see if his or her watering system is activated and what the current watering intervals are. The user may also activate and visually monitor video systems. In this way, all real-time data may be displayed such that a user may see all systems, appliances and status as well as settings through a single interface.

Through the same interface, a user may initiate setting changes to any of or all home systems or appliances that he or she has registered with the service. Such setting changes may be permanent or temporary. For example, if a remote user notices that it is raining, he may access his home watering system through the Internet, select the watering system, and send a signal through the Internet to have the home system turn it off. Moreover, an S/A device such as device 37 may be wired to an associated sensor on a watering system that enables "smart watering" thereby automatically initiating a temporary shut down of the system to save water. There are many possibilities.

Data updates in a preferred embodiment are uploaded automatically from BS 35 to server 27 on a periodic basis. In some embodiments, a continuous status update feature may be provided. In this way, a remote user may have current data regarding function and conditions at home. A wireless remote user at Laptop 39 at mobile unit 17 may enjoy the same service and function capability as from remote premise 19 using cellular network 13 for communication. The exact paths of data communication through Internet 11 or other interconnecting network from each remote premise 17, and 19 to home premise 15 and local equipment will be apparent to the skilled artisan.

In this example, SW executing at server 27 enables database communication for users and is a principal application of the service. In an alternative embodiment, a user may initiate off-line setting changes by utilizing such as Laptop 39, or home PC 33 directly to BS 35, thus bypassing server 27. However, such changes will be uploaded to server 27 at a next reporting interval for BS 35. To register a new S/A device to the service, Internet connection to server 27 must be achieved to activate the new device parameters.

It will be apparent to one with skill in the art that a user may access his or her home systems and appliances from any Internet appliance capable of navigating the Internet without departing from the spirit and scope of the present invention. The only requirement is that such an Internet appliance can maintain an Internet connection, has enough memory for SW implementation (browser plug-in) and sufficient input capability for interaction with server 27.

Figure 2:
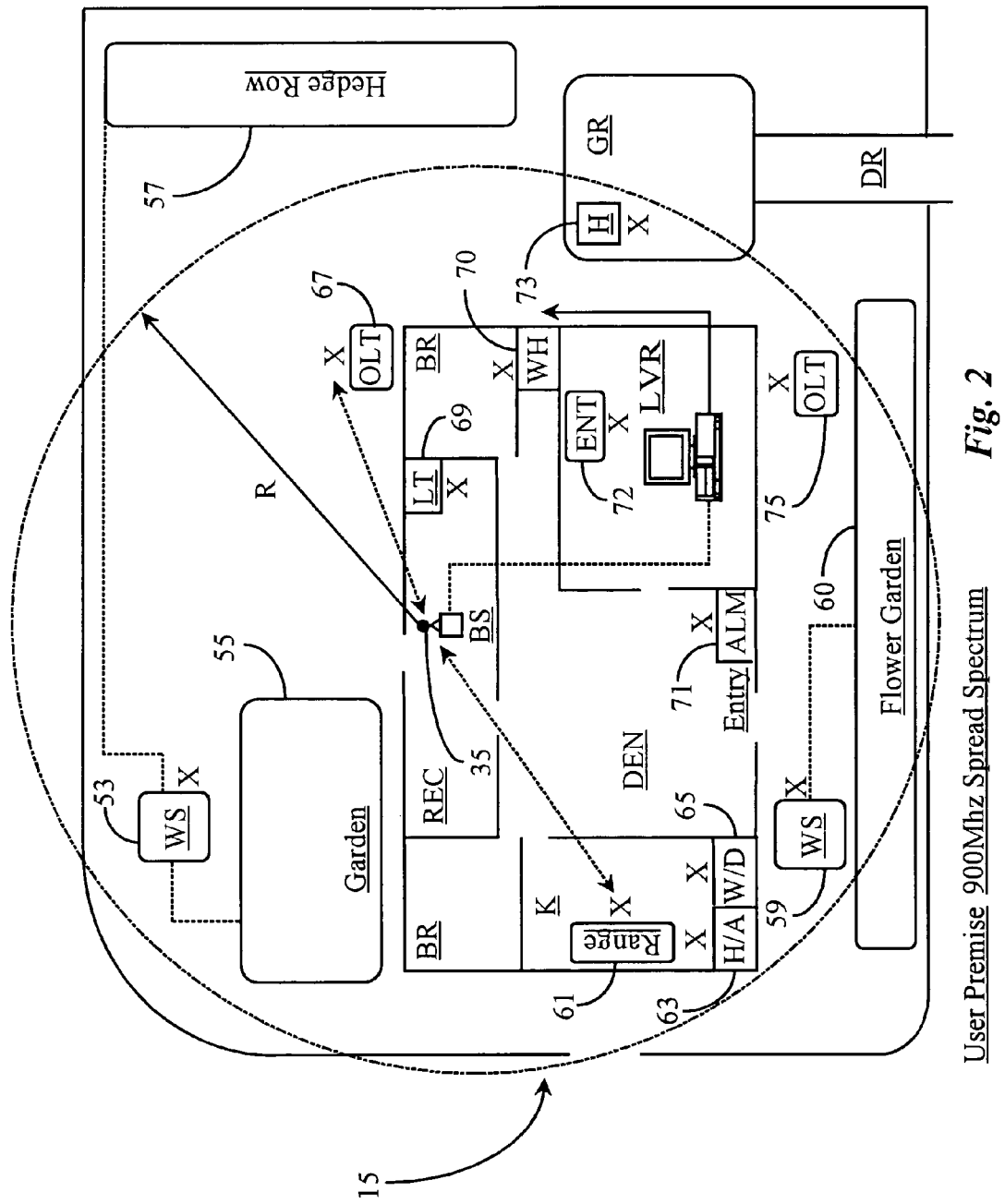
FIG. 2 is an overhead view of the user premise of FIG. 1 illustrating various automated home-systems and appliances adapted for remote control according to an embodiment of the present invention.

FIG. 2 is an exemplary structured plan view of user premise 15 of FIG. 1 illustrating various automated home-systems and appliances adapted for remote control according to an embodiment of the present invention.

BS 35 is installed in a central location in premise 15 such that its RF communication range R covers all S/A devices (designated in plural herein by distributed Xs). As previously described, BS 35 communicates directly to S/A devices (Xs) as illustrated by dotted double-arrows connecting BS 35 to two distributed Xs as shown. Once S/As are wired to existing systems or appliances, they are generally held stationary by being connected to the installed mechanism. In this way RF range is known by BS 35. However, in some embodiments, an S/A device may be configured to a non-stationary appliance or appliances, such as a plurality of floor-space heaters or the like with rollers that may be moved to different locations from time to time. In this case, BS 35 and S/A devices would perform an RF range check when activated by virtue of installed RF components known in the art.

In this example, premise 15 has an automated back-yard watering system (WS) 53, which supplies water to a garden 55 and a peripheral hedge row 57 as illustrated by dotted waterlines connecting the above-mentioned elements to WS 53. An associated S/A device (X) is wired to WS 53 and controls actuation, timing, and any sensor function therein. For example, WS may be programmed to initiate watering once in the morning for garden 55 and twice daily for hedgerow 57. WS 53 may have a precipitation sensor installed enabling automated shutdown if rain occurs. Note that all S/A devices must remain within the effective range R of BS 35 although beneficial effects from systems such as watering systems are, of course, not range-limited.

Premise 15 has a second front-yard watering system WS 59 that is designated to supply water to a flower garden 60. An S/A device (X) associated with WS 59 may be equipped with several different settings related to which type of flowers in garden 60 will be watered at what times to what extent. A precipitation sensor as well as a temperature sensor may be provided as part of the S/A associated with WS 59 thereby providing a feedback mechanisms that act to change settings automatically.

Lighting systems registered with the service and part of premise 15 include outdoor lighting system (OLT) 67 (back yard), outdoor lighting system (OLT) 75 (front yard) and lighting system (LT) 69 (indoor). Systems 69 and 75 may have their associated S/A devices (X) equipped with many settings controlling when light activates, the intensity of light, and so on. Additional sensors, part of lighting systems may be wired to S/A devices with such sensors providing measurement of existing outdoor sunlight such that systems are automatically actuated when the outdoor or indoor light levels fall to a certain intensity. LT 69 may have several actuation settings such as may be required for different parts of premise 15. For example, den lights may turn on at a certain time whereas bedroom (BR) lights may activate at a different time and so on.

Other systems included in this example are a heating and air-conditioning system (H/A) 63 and an alarm system (ALM) 71. Each system has an S/A device associated with it (X). One with skill in the art will appreciate that H/A system 63 may have multiple setting options that are triggered by mode and temperature readings. For example, there are two modes, heating and air. Each mode is thermostatically controlled for automation purposes. Each mode may also be divided geographically such that certain areas of premise 15 receive different coverage. For example, heating may be programmed to actuate in the den and living room (LVR) when the thermostats in those rooms drop to a certain degree. In another area such as, perhaps, the bedrooms (BR), heat may be activated when thermostat readings in those areas drop to a certain degree other than the threshold established for the living room and den areas. Air mode may have similar enhancements provided for separate areas. An S/A device for H/A 63, would be programmed with all of the required settings and actuation parameters that are available with the H/A system.

ALM system 71 may use a variety of technologies in singular or combined fashion. An S/A device associated with ALM 71 would incorporate all of the settings and actuation triggers established with ALM system 71 including video recognition, laser triggers, photoelectric triggers, motion triggers, broken circuit triggers and so on.

In addition to the automated home-systems described above, there are several automated appliances in premise 15 that are registered with the service. While systems such as watering, heating, air conditioning, and lighting systems have more or less standardized functions, singular appliances present opportunities for much more creativity in programming an associated S/A device.

A cooking range 61 located in a kitchen area (K) is, in this example, included and registered with the service. Range 61 may be remotely controlled by adapting an S/A device (X) thereto to allow a user to initiate such functions as, "begin oven pre-heating 30 minutes before my arrival home at 6 PM". Another function may be to "begin self-cleaning cycle at noon on Wednesdays". There are many possibilities, which may be initiated either locally or remotely as described in FIG. 1. Other appliances, which may be remotely controlled and which are illustrated herein include a water heater WH 70, a space heater (H) 73 located in the garage (GR), an entertainment center (ENT) 72 located in the living room area and a washer/dryer (W/D) 65 located in the kitchen area.

It will be appreciated that S/A devices (X) associated with the on-site appliances may be configured to control either a sub-set or all of the functions provided by these appliances. It will also be appreciated that additional enhancement may be provided to such appliances that are not typically offered, or even possible, with the appliance without the S/A device. For example, if ENT 72 is a television set, and a user is at work such as at remote premise 19 of FIG. 1, then he or she may initiate a shut-down of ENT 72 at a time when children are home and supposed to be doing homework or chores. An S/A device associated with ENT 72 would be configured to and provide remote control over such function parameters.

It will be apparent to one with skill in the art that, in this case, a home, and in other cases, a business may be activated as a "smart home" or "smart business" by way of the present invention without extensive mass cabling associated with current art systems, and that appliances and systems in the home not remotely programmable and controllable become so with the integration with the inventive system described herein. S/A devices are not limited to being standard to offered appliances or systems, but may be created in customized fashion for virtually any electronically controlled appliance or system. All that is required to integrate a system or appliance to an S/A device is appropriate by-pass wiring connections from system or appliance controls to provided S/A terminals.

In this example, there are 12 illustrated S/A devices specific to their host systems or appliances. However, the system of the present invention in a preferred embodiment provides for as many as 256 S/A's per BS.

Figure 3:
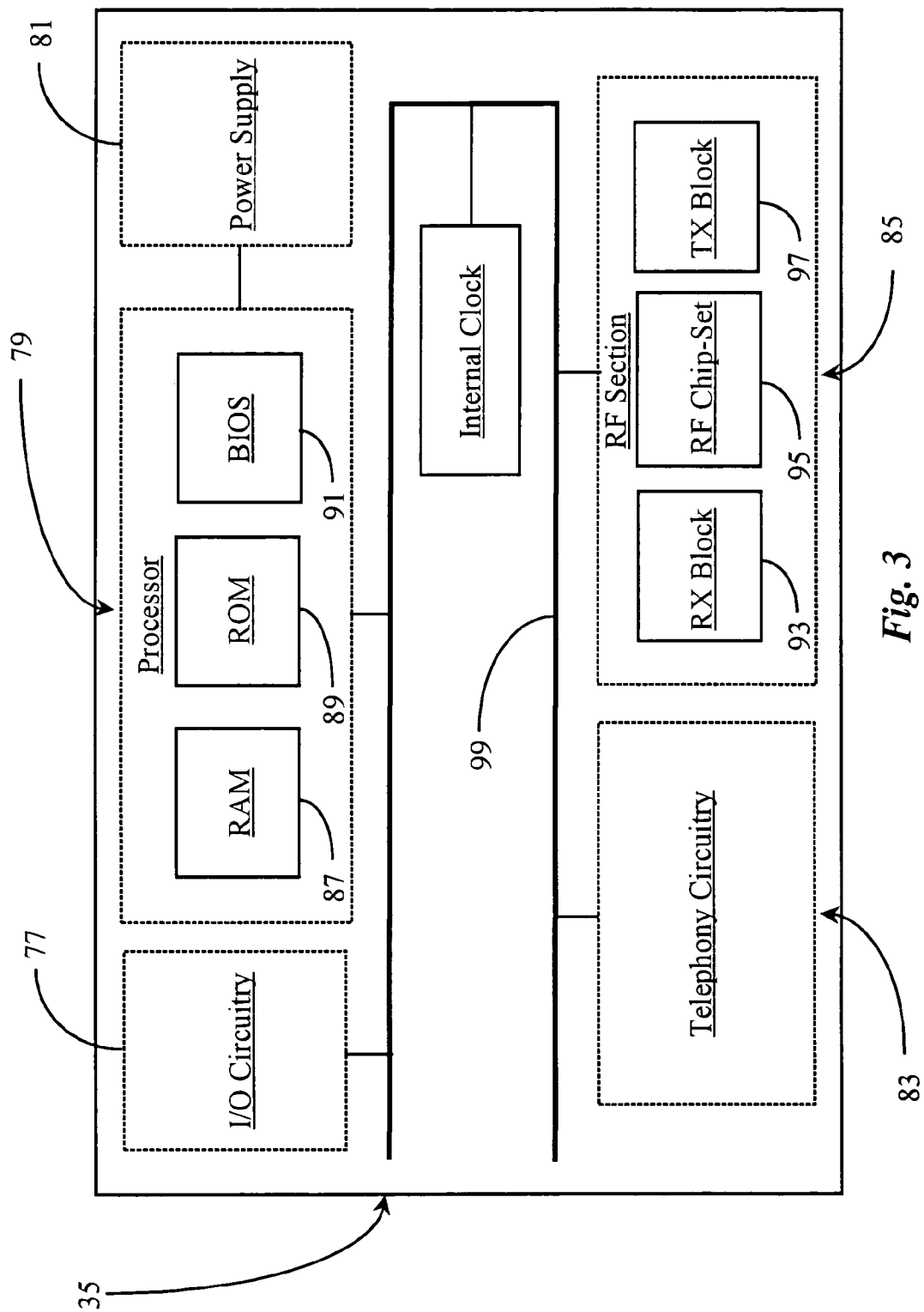
FIG. 3 is a block diagram illustrating various components and circuitry of the base station of FIG. 1 according to an embodiment of the present invention.

FIG. 3 is a block diagram illustrating various elements comprising base station 35 of FIG. 1 according to an embodiment of the present invention. BS 35 as previously described is a computerized unit with RF communication capability. As such, BS 35 has an RF section provided therein and adapted to enable RF communication with such as S/A device 37 of FIG. 1. RF section 85 comprises a receiving (RX) block 93, a transmission (TX) block 97, and a RF chip-set 95, which provides RF functionality. RX block 93 and TX block 97 contain all of the required circuitry as known in the art for acquiring and broadcasting radio signals.

Chip-set 95 contains all of the required hardware and circuitry to enable RF communication as known in the art. In this example, RF section 85 uses a 900 MHz spread-spectrum phone band, which is known by the inventor to be publicly accessible and available at low cost due to its maturity related to existing options. However, other frequencies may be utilized without departing from the spirit and scope of the present invention. RF section 85 is connected to a communication bus structure 99 provided and adapted to manage internal communication between various modules and components in BS 35, and also to appropriate antenna apparatus not shown.

BS 35 has a power supply module 81 provided therein and adapted to supply power. Power source may be from a local power outlet. In one embodiment BS 35 may be powered by a rechargeable battery pack. Power supply 81 is connected to all power-using elements in the BS, and electronic elements, including processor 79 are interconnected by a communication bus 99.

Processor 79 has a BIOS section 91 provided therein and adapted to control pre-boot operations and normal booting functions as may be required pre-configure functionality and to bring BS 35 to a full powered-on state, as is well-known in the art. In a preferred embodiment, BIOS 91 is flashable such that data written thereon may be altered. Such data or code is responsible among other things for managing device addressing, RF communications protocols, and over-the-air RF encryption in the commands issued between the BS 35 and S/A devices such as device 37 of FIG. 1.

Processor 79 also has a read only memory (ROM) section 89 to hold permanent data such as an operating system routine required for operation of BS 35. A random access memory (RAM) sector is provided and adapted to hold temporary data such as routines resulting from setting changes and the like, and temporary data. A non-volatile version of RAM 87 may also be provided to hold data that is to be retained after BS 35 is powered off.

An input/output port (I/O) 77 is provided and connected to bus structure 99, and adapted for serial input and output capabilities over a serial cable connection to a host such as PC 33 of FIG. 1. The serial connection may be wireless instead of hardwired as previously described. A USB or other known serial communication protocol may also be used.

User-initiated programming from such as web-server 27 of FIG. 1 is sent in the form of binary command files. Such commands, or end programs as termed by the inventor, are received by BS 35 over the serial cable from PC 33 and stored in RAM 87 for interpretation and subsequent execution. BS 35 is a master unit and treats all S/A devices under it's control as slaves. That is to say that BS 35, by virtue of it's described capabilities and controls, coordinates all S/A devices under it's umbrella according to received input developed at server 27 (FIG. 1) in this example.

BIOS 91 contains a line-based interpreter for Pseudo-code binary command files, indexing and addressing protocols, interrupt handling routines, RF transmission infrastructure, and so on. A real-time embedded clock (not shown) is provided in BIOS 91 that will roll over every seven days. Such a clock synchronizes with a command source server such as server 27 (FIG. 1) every time it connects thereto. It is this clock that dictates timing of commands sent by a user.

A telephony circuitry 83 is provided and connected to bus structure 83. Circuitry 83 contains all of the circuitry and components required for dial-up telephone access as known in the art such as may be required of a stand-alone unit in one preferred embodiment. In a stand-alone version of BS 35 a telephone line would be plugged in and access to Internet 11 may be accomplished with an internal modem and dialer. An Internet access program would also be required. In another embodiment, circuitry 83 may be used to page or telephone user's to alert them of a perceived emergency regarding one of a user's registered home systems or appliances.

It will be apparent to one with skill in the art that BS 35 may contain fewer or more individual components than are illustrated herein without departing from the spirit and scope of the present invention. For example, telephony circuitry 83 is not required to practice the present invention in all embodiments. Moreover, a component that enables configuration of S/A devices by magnetic induction may be added. Such a component is not described in this example, but is described in enabling detail later in this specification as magnetic induction is not specifically required for configuration purposes. The inventor intends that the example illustrated herein represents one of a variety of possible BS circuitry configurations.

Figure 4:
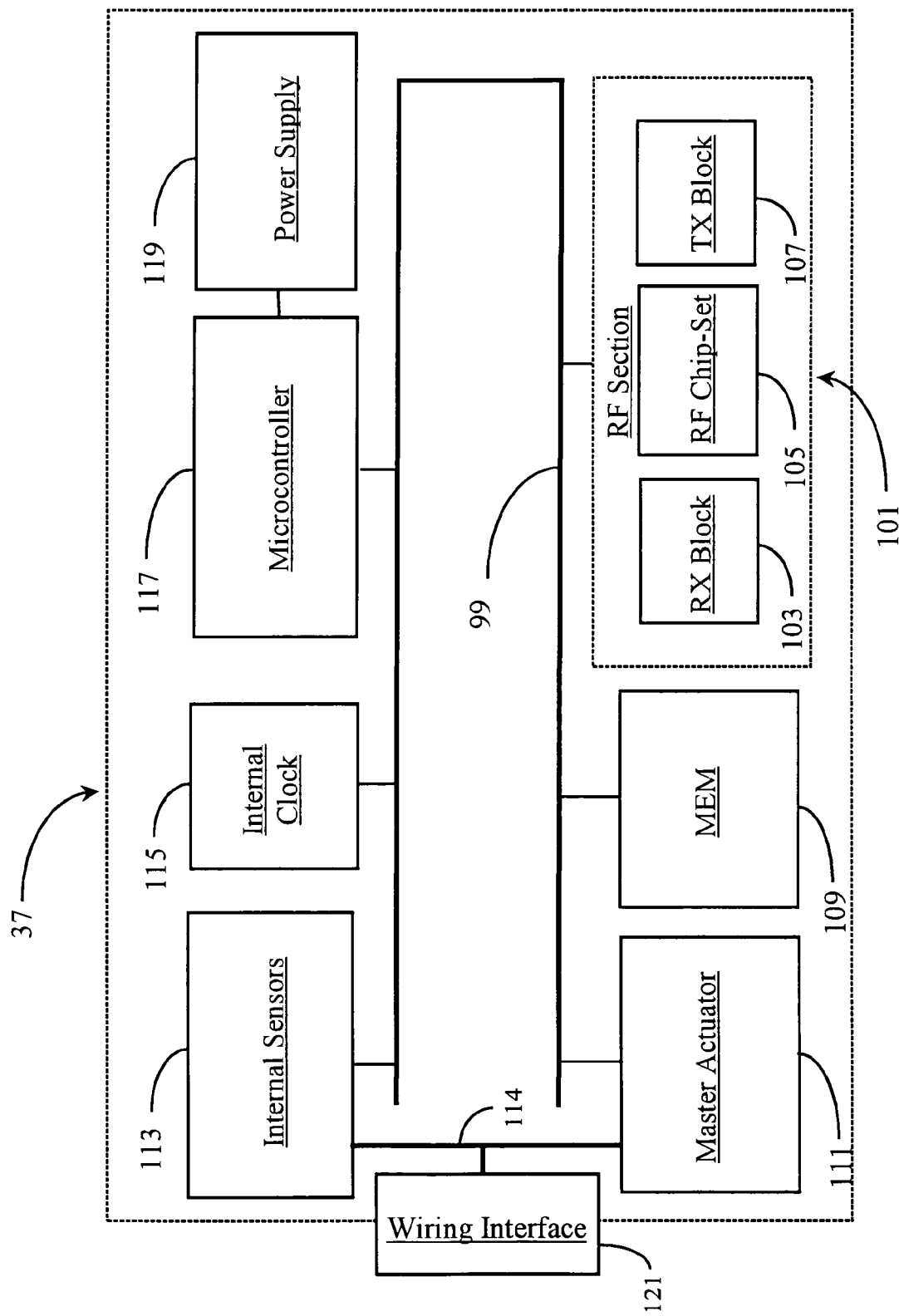
FIG. 4 is a block diagram illustrating various components and circuitry of a sensor/actuator device according to an embodiment of the present invention.

FIG. 4 is a block diagram illustrating various components and circuitry of sensor/actuator device 37 of FIG. 1 according to an embodiment of the present invention. S/A device 37, like BS 35, is a computerized device capable of RF communication. As such, S/A device 37 has an RF section 101 for RF communication. RF section 101 comprises a receiving (RX) block 103, a transmission (TX) block 107, and an RF chip-set 105.

RX block 103 contains all of the circuitry and components required for receiving RF signal transmissions broadcast from BS 35 of FIG. 1. TX block 107 contains all of the circuitry and components required for transmitting RF signals to BS 35 of FIG. 1. RF chip-set 105 contains all of the hardware and components required for enabling RF communication as is known in the art and described in FIG. 3 above with respect to chip-set 95. A good example of an existing and compatible chip-set implementation for chip-set 95 and chip-set 105 is an Infineon™ 840 MHz digital RF chip-set known to and available to the inventor.

Device 37 has an internal communication bus structure 99 provided therein and adapted to manage communication between various illustrated modules. A memory (MEM) 109 is provided within device 37 and adapted to store various temporary and permanent routines required for operation and RF protocol dissemination and implementation. MEM 109 may be any combination of ROM/RAM as deemed necessary for operation. It will be apparent to a skilled artisan that an S/A device such as device 37 may vary according to implementation. Therefore MEM 109 may vary accordingly. MEM 109 is of a size to be suitable for any specific implementation.

A master actuator 111 is provided within device 37 and connected to bus structure 99. Actuator 111 is adapted as a controlling actuator for any connected home system or appliance that may be wired thereto. A master actuator such as actuator 111 replaces any generic actuators inherent to connected systems or appliances. For example, if a watering system were connected to device 37, then actuator 111 would turn on or "actuate" the system. It is not always, or specifically required that an actuator such as actuator 111 be present in a device such as device 37. Device 37 may be adapted to control a system or appliance through a generic system or appliance actuator. However, bypassing a generic actuator represents a convenience in wiring installation. In an alternative preferred embodiment, however, S/A device 37 has an I/O system for providing outputs of suitable voltage and current ability to operate components of connected systems and appliances, as well as to accept inputs from sensors in those systems and appliances, and to translate incoming sensor signals into suitable signals on bus 99 for use by other elements of the S/A device. In this case one may assume that elements 111, 113, and 121 comprise an input-output (I/O) section and interface between external controlled systems and appliances and the S/A device. This I/O region is necessary because outputs by the microcontroller must be converted to voltage and current levels that are needed for driving actuators on the controlled system or appliance, and inputs from the system or appliance must be converted to the necessary voltage level needed for the microcontroller.

Wiring interface 121 is provided and connected suitably to sensors block 113 and actuator block 111 by wiring 114. Wiring interface 121 may be of the form of a plug or other type of terminal connector. Interface 121 may vary in scope and physical characteristics from one S/A device such as device 37 to another. A wiring interface such as interface 111 is adapted to a home system or appliance to which the associated S/A device is configured. A wiring interface such as interface 121 may include such as output control (actuator) lines, sensor lines, a ground wire, and so on. There are many electrical connection techniques known in the art and available to the inventor for implementing a wiring interface such as interface 121, one of which is a simple terminal block, although in some cases a standard connector plug may be provided, to which a plug for a specific appliance or system may be engaged.

Device 37 has a power supply 119 adapted to supply necessary power. Power supply 119 may be a battery, a rechargeable power pack, or a wall plug, or a combination thereof. Power supply 119 provides power by suitable lines to all power-using elements of the S/A/device, and all electronic elements communicate on bus 99. Micro controller 117 is adapted to control and manage all function specific to device 37 according to input received from a BS such as BS 35 of FIG. 1 and, in some cases, incoming sensor information.

An internal real-time clock is provided within device 37 and connected to bus structure 115. Clock 115 is synchronized with the internal clock of BS 35 and with an internal clock (not shown) residing in a configuration server such as server 27 of FIG. 1. In this way, all timing function associated with run-time routines and actual home-system or appliance process is synchronized. Optional internal sensors 113 are provided within S/A device 37 and connected to bus structure 99.

Internal sensors 113 may include any sensor devices which may be deemed appropriate for use as feed-back mechanisms for automated control of a connected home-system or appliance. Examples of such sensors include, but are not limited to a temperature sensor, precipitation sensors, altimeters, light sensors, sound sensors, vibration sensors, and so on. Sensors 113 may be included in an S/A device such as device 37, and in many cases appended to the device through wiring interface 121, in order to enhance functionality of a connected home-system or appliance. In some embodiments, existing home-system or appliance sensors are wired to an S/A device such as device 37 through such as wiring interface 121.

Referring now to both FIGS. 3 and 4, bi-directional communication is achieved by virtue of respective RF sections 85 (FIG. 3) and 101 (FIG. 4). BS 35 receives instruction from such as server 27 of FIG. 1, communicates such instruction to S/A device 37 via RF signals, and S/A 37 then operates a connected home-system or appliance according to the received instruction and, in many cases, sensor inputs. The novel implementation of RF communication allows a "smart home" to operate with 256 or more connected systems or appliances without hardwiring with massive cable structures. The number of systems operable is a scaling function in design.

In functions of the present invention where remote configuration is involved, there are several separate communication protocols used. Hyper-Text-Mark-up-Language (HTML) is used at server and web-based interfaces. Transfer-Control-Protocol/Internet-Protocol (TCP/IP) is used in sending of instruction or "end programs" over such as the Internet to CPE at a user's end. Serial data transmission is used from such as an Internet host (PC) to a BS such as BS 35 of FIG. 1. RF protocols are used in wireless transmission from a BS such as BS 35 of FIG. 1 to a S/A device such as S/A 37 of FIG. 1. More detail about communication protocols is provided later in this specification.

Figure 5:
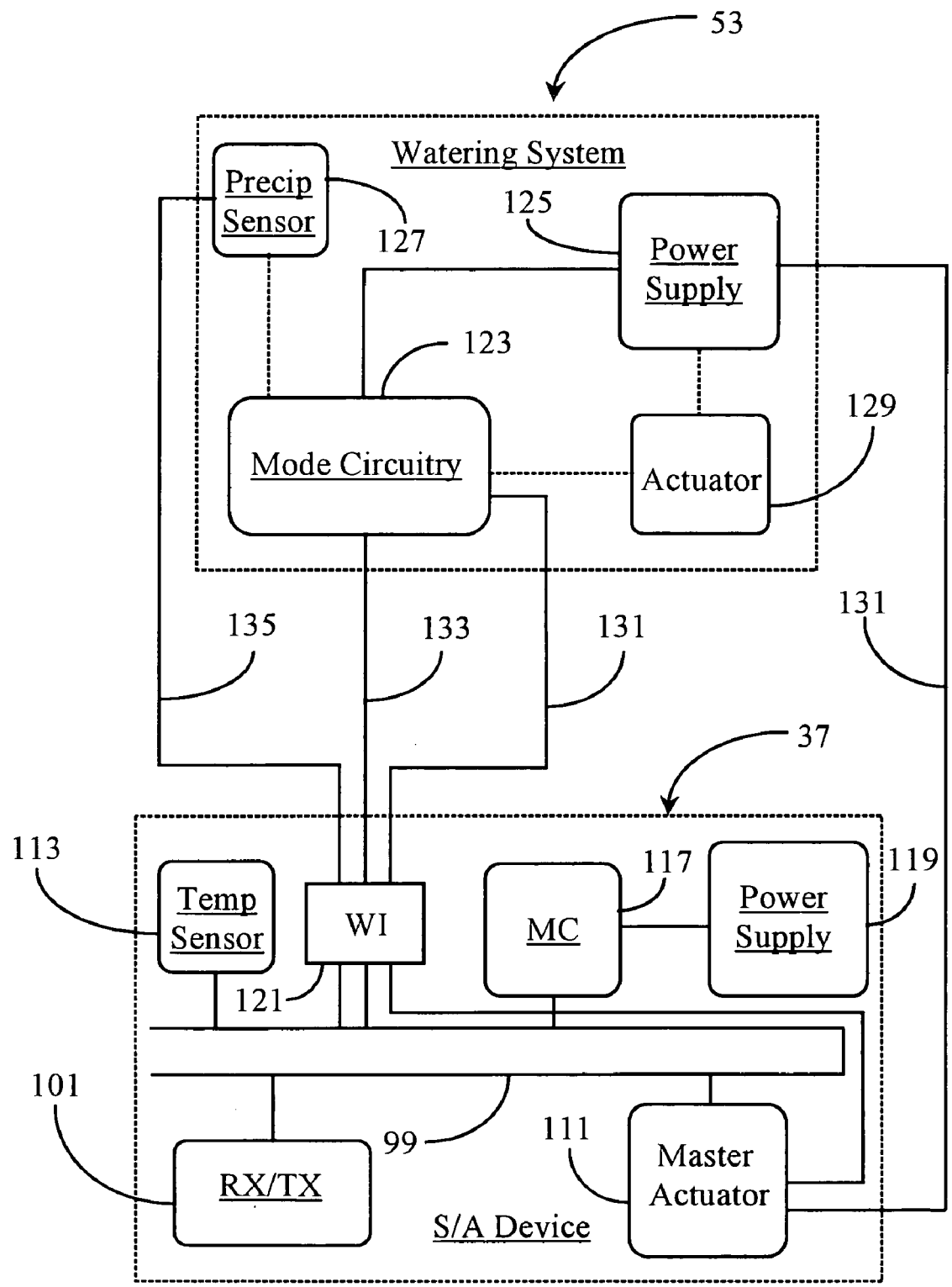
FIG. 5 is a block diagram illustrating an exemplary wiring relationship between a sensor/actuator device and an automated home-system according to an embodiment of the present invention.

FIG. 5 is a block diagram illustrating an exemplary wiring relationship between an S/A device 37 and an automated home-system according to an embodiment of the present invention. In this example, S/A device 37 is illustrated as integrated with a watering-system control box 53. The inventor illustrates device 37, in this example, with fewer components than in the example of FIG. 4 in order to save drawing space, however components of FIG. 4 such as MEM 109 and clock 115 may be assumed to be present.

Watering-system control box 53 represents an automated or semi-automated control station or box adapted to control watering of a lawn, garden, or the like and will hereinafter be referred to as control box 53. Control box 53 has a power supply 125 provided therein, which may derive power from a DC source as is typical with most systems of the type, or in any other convenient manner. Control box 53 has an actuator 129 to actuate watering (open one or more solenoid-operated valves, for example) according to a timing switch (not shown) as is generally known in the art. A mode circuitry 123 is provided within control box 53 and represents any additional circuitry or switching present for the purpose of toggling between available modes such as heavy watering opposed to light watering, watering separate portions of a serviced area at separate times, and so on. A precipitation sensor 127 is provided and illustrated within control box 53. Sensor 127 is adapted to sense rain and acts as a feedback mechanism to circuitry 123. In this case, circuitry 123 would have a temporary shut-off mode in case of rain as reported by sensor 127. Although sensor 127 is illustrated as residing within control box 53, in actual practice sensor 127 would, more likely, be externally deployed in some convenient, outdoor location near the area serviced by the associated watering system.

In this example, function actuator 129 of control box 53 is replaced with the function of master actuator 111 of device 37. This may be accomplished by replacing former power-to-actuator and actuator-to-mode lines (dotted lines) with a loop line 131 running from power supply 125 directly to actuator 111 with a return line (131) routed through interface 121 directly to mode circuitry 123 in control box 53. In this way, power supplied to the generic watering system may be used to power actuator 111, which may be controlled by micro controller (MC) 117 according to input from RX/TX section 101. Any timing controls (none shown) generic to control box 53 may also be bypassed in favor of controls provided by device 37.

In another embodiment, actuator 111 may be powered by power supply 119 of device 37 and line 131 may be run from actuator 111 directly to mode circuitry 123 of control box 53 through wiring interface 121. In either case, actuator 129 may be disconnected in this embodiment. In still another embodiment, device 37 may not have a master actuator such as actuator 111 installed therein but instead, may be adapted to use existing actuator 129 (control box 53) by provision of an overriding control line from interface 121 directly to actuator 129. In this case, MC 117 would be adapted to control actuator 129. There are many possibilities.

Mode circuitry 123 in control box 53 may be adapted for control (selection settings) by MC 117 through a control line 133. Precipitation sensor 127 would normally have a reporting line (dotted line) connected to circuitry 123 such that feed back from sensor 127 may be considered in switching modes. However in this embodiment, a reporting line 135 is established from sensor 127 through wiring interface 121 and onto communication bus 99. In this way, precipitation readings from sensor 127 may be reported to and monitored from network level such as at server 27 of FIG. 1.

A temperature sensor 113 is provided with S/A device 37 and connected to bus 99. Sensor 13 is adapted, in this embodiment, as an optional sensor that monitors local temperature day and night, and provides appropriate proportional signals on bus 99. Temperature readings provided by sensor 113 may be considered for use in considering mode selections at circuitry 123. Sensor 113 is optional and may or may not be present. Other types of sensors may also be included within S/A device 37 as may be deemed appropriate for application.

It will be clear to the skilled artisan, with the descriptions provided, that there are a variety of ways sensors of the controlled system or appliance, sensors of the S/A device, output signals and actuators of the controlled device, and output lines and actuators of the S/A device may be interconnected to accomplish the monitoring and control purposes of the present invention.

In many cases, additional enhancements may be added to a standard home-system such as the above-described watering system controlled by box 53 through adding and integrating components into box 53 that are controlled by and communicate with MC 117. Sensors, switches, mode selections, power-saving modes, and so on may be implemented and controlled by provision of a suitable S/A device and components thereof.

It will be apparent to one with skill in the art that the schema in this example is but one of many methods of integrating an S/A device such as device 37 to a control station or box such as box 53, which in this case controls an existing watering system. There to, are many ways of integrating an S/A device with control circuitry specific to home-electronic appliances. Wiring, bus extension, addition of sensors, switches and like components may be a part of the integration. The inventor intends that such integration should be fairly simple such that one need not be an electrician or engineer to connect an S/A device to a home system or appliance. Using terminal connectors or interfaces such as interface 121 is meant to simplify integration. In practice of the present invention, S/A devices are, in most cases, built for specific systems such that settings, modes, and the like are known in advance thereby facilitating a standard and simple installation. In an alternative preferred embodiment new home-systems and appliances may be provided with built-in S/A devices before purchase.

Remote Control Operation and Settings Manipulation

It is an object of the present invention that a user may be able to enhance and automate existing home systems and appliances for remote control as well as have the opportunity to purchase new systems and appliances already equipped for automation and remote control according to embodiments of the present invention.

Figure 6:
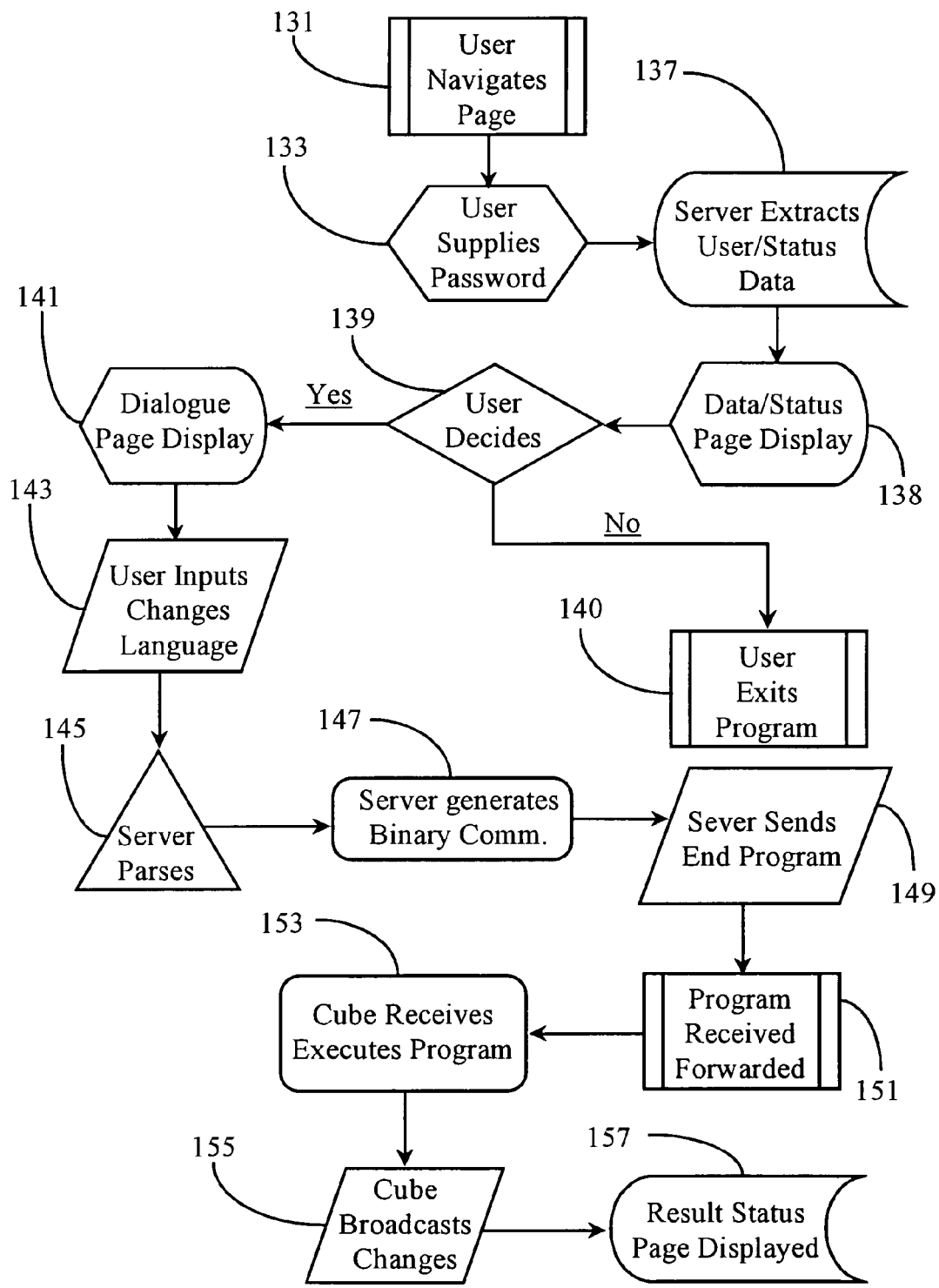
FIG. 6 is a process flow diagram illustrating various logical steps for re-setting or monitoring an automated home-system or appliance from a remote location according to an embodiment of the present invention.

FIG. 6 is a process-flow diagram illustrating various logical steps for re-setting or monitoring an automated home-system or appliance from a remote location according to an embodiment of the present invention. At step 131, a user navigates to a specific web page provided by server 27 of (FIG. 1) using an Internet-capable appliance equipped with a browser Interface and a SW plug-in provided according to an embodiment of this invention. Remote locations would include such as mobile unit 17 or remote premise 19 having at disposal laptop 39 and/or PC 21 respectively as qualified Internet appliances.

The term "remote location", as used by the inventor in this example, is intended to denote any location from which monitoring system/appliance status or changing CPE settings may be performed using any Internet-capable appliance, using such as Internet 11 and server 27 (FIG. 1) to effect any changes. By this definition, PC 33 at user premise 15 of FIG. 1 may be used to "remotely" interact as long as the network-level equipment (server 27 and repository 29) and software are used to aid changes.

In remote monitoring and changing of settings, PC 33 acts as an Internet Host (IH) for all requesting remote appliances except in an embodiment wherein a BS such as BS 35 (FIG. 1) is a stand-alone device. In the latter case, PC 33 would not be required in order to practice the present invention. If PC 33 has all of the required software and available data resident at its own facility, then direct off-line monitoring and changing of settings is possible. However, such newly-changed settings would have to be uploaded to server 27 to provide a repository update in order to aid future remote interaction.

At step 133 a user supplies at least a password for authentication of the user to the service. At step 137, server 27 (FIG. 1) extracts user information and status data from a connected data storage such as in repository 29 (FIG. 1) using appropriate DB software.

At step 138 the server displays an interactive web page in HTML format to the user, which appears in the user's browser window. A user may interact with the service of the present invention through a single interface (Browser). At step 139 a user may make a decision whether or not to leave current settings as they are reported in a status section of the page, or he or she may, if desired, affect changes to such settings. If a user decides in step 139 not to make any changes, he or she may monitor status and then exit (log off) the program at step 140.

If a user at step 139 elects to affect changes to one or more of his or her registered systems or appliances, then he or she may cause a dialogue display to appear at step 141 by clicking on an icon or entering a keyboard command. Such a dialogue display is an interactive software interface equipped with a parsing engine that is adapted to recognize natural language.

In another embodiment such a dialogue display may, instead of using a parser, list all of the user's active and inactive S/A devices and their associated systems as well as all available options such that a user may simply check boxes associated with setting changes much like re-configuring a standard software program. All of the user's registered system and appliance data is stored and updated periodically and, in some cases, in real time. Such data is stored in a repository such as repository 29 of FIG. 1 and is available in the form of a display page as described in step 138.

In this example, SW running on such as server 27 uses a natural language parsing engine and perhaps one input field for adding data which, after adding, will replace data currently used in existing settings associated with the user's registered home-systems or appliances. At step 143, a user simply types in new settings to replace old settings. In this step, old settings may be displayed for review before a user attempts to initiate new settings. Moreover, a confirmation step (not shown) may exist to insure that a user does not accidentally change settings to one or more home-systems or appliances if not intended. A user enters each setting change along with S/A address, device number, and any other required identification. In some cases, a user may be required to re-enter his or her password for each S/A device for security reasons.

At step 145, a parsing engine used by server 27 parses each entered request and confirms feasibility of each request. There may be specific words and/or symbols that are requested by the service to be included in each request. Such words or symbols known to the parser may represent data required to identify, locate, and describe a S/A device being changed. After all requests are submitted and validated at step 145, a server such as server 27 (FIG. 1) generates a binary command or set of commands, termed an end program by the inventor, at step 147. Such an end program may contain a single setting change for one registered system or appliance, or it may contain many changes to many S/A devices.

At step 149 a server such as server 27 (FIG. 1) sends an end program over such as Internet 11 to a user's identified BS such as BS 35 of FIG. 1 where it is stored for execution. At step 151, an end program reflecting all of a user's desired setting changes is received at his or her BS over such as a serial cable connected thereto and to his or her PC as in the case of FIG. 1. However, in one embodiment, BS 35 could be a standalone device wherein data is received directly from the Internet.

Moreover, monitoring and initiating setting changes may be performed off-line if a user's PC such as PC 33 is equipped with all of the required software and data storage capabilities. This example assumes, however, that setting changes are performed remotely through such as Internet 11 of FIG. 1.

At step 153, a BS such as BS 35 (termed a "cube" by the inventor) receives and executes an end program downloaded from PC 33 or directly from server 27 (stand alone embodiment). At step 155, BS 35 (cube) broadcasts the appropriate setting changes to the appropriate S/A devices such as device 37 of FIG. 1 using RF technology as taught in the above disclosure. Individual S/A devices pick-up their broadcasts over a 900 MHz (example) channel and execute the appropriate changes to their connected systems or appliances. Also, effected S/A devices may report back to BS 35 the new state of settings for their connected systems or appliances as confirmation of success or failure to initiate. In this way, accurate data may be reported back to such as server 27 for updating data in repository 29 (FIG. 1).

If for some reason, perhaps due to mechanical malfunction or other error state, an S/A device cannot effect a requested settings change, an error report may be immediately sent back to server 27 such that a user may be notified of the particular failure. A user may elect to wait on-line for status confirmation in an embodiment wherein real time reporting is available. Such confirmation does not indicate that settings have actually been activated, as many devices and systems will not actually use the new settings until their next timed interval of operation commences. Therefore, a home-system or appliance does not have to be active to accept setting changes.

At step 157, a new status page is displayed on request of a user after the process is performed and confirmed. Time expiring between step 131 and step 157 may vary, depending on how many S/A devices are changed, and in some cases, the nature of the system or appliance and associated setting changes. For example, BS 35 communicates in half-duplex with S/A devices one at a time. After broadcasting, BS 35 listens for a response from the most recently addressed device. If a response is missed, the requesting S/A device will retry until it establishes communication. An end program may include all setting changes to all devices therefore some time may be undertaken by a user wishing to change many devices. However, in one embodiment, a dialogue display may offer a program for download that allows a user to configure changes off-line and then re-contact such as server 27 for uploading the finished program. In this way expense of remaining online may be reduced.

In still another embodiment, an interactive form-template may be provided as part of a client SW application, which allows a client to first configure changes and then to go on-line to implement them. There are many possibilities. Similarly, SW as described and illustrated in FIG. 1 may be provided many varying capacities to host, remote, and network machines.

It will be apparent to one with skill in the art that the process steps illustrated in this example may very in order and number without departing from the spirit and scope of the present invention. For example, step 133 may include a step for entering a user name. Step 151 is not required if BS 35 is a stand-alone device. Moreover, there may be additional steps and sub-steps provided. The inventor intends that the example represented herein exemplifies just one of many possible process sequences by which a user may monitor and effect setting changes to home-systems and appliances from a remote location.

Configuring an S/A Device for Operation

Because RF Spread Spectrum technology in one embodiment is used for communication between a BS and a plurality of geographically-distributed S/A devices, there exists a possibility of range overlap regarding adjacent BSs. For example, if neighbors situated in close quarters to each other both are practicing the present invention, their BS ranges may overlap causing a security issue when configuring one or more new S/A devices for service. Therefore, the inventor provides a non-RF apparatus and method for configuring S/A devices for first time use.

Figure 7:
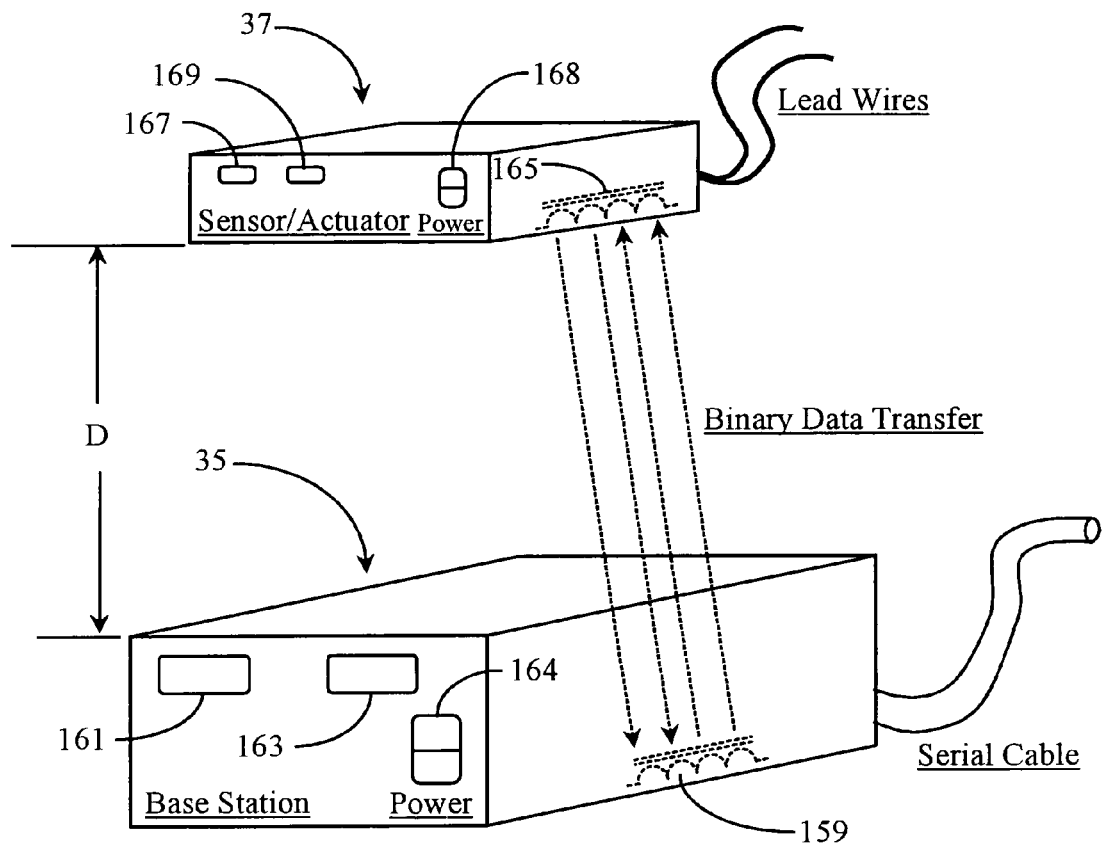
FIG. 7 is a perspective view of a sensor/actuator device being configured to a base station using magnetic induction technology according to an embodiment of the present invention.

FIG. 7 is a perspective view of S/A device 37 of FIG. 1 being configured to BS 35 of FIG. 1 using a magnetic-induction (MI) technology according to an embodiment of the present invention. The shapes shown in FIG. 7 are exemplary only. In a preferred embodiment, BS 35 is a cube having an approximate 6" length, width, and height. S/A device 37 may vary in shape and size according to housed components required for integration to a specific home-system or appliance. As such it may be very small in some implementations and quite larger in others.

It should be noted here that one S/A may, in one embodiment, be adapted to control several like appliances such as, perhaps several smoke alarms. However, it may be more economical to provide each of several smoke alarms with it's own S/A device in order to reduce wiring requirements from an S/A device to distributed smoke alarms.

Referring now back to FIG. 7, device 37 has an on/off power switch 168 to allow a user to power device 37 on or off. Two light-emitting diodes (LEDs) 167 and 169 are similarly provided in a convenient and visible location on the outside casing of device 37. LED's 167 and 169 are functional display lights used during a magnetic induction (MI) device configuration process.

BS 35 is equipped with a power on/off switch 164 and two LEDs 161 and 163 as described for device 37. As with device 37, LED's 161 and 163 are used during MI configuration. Magnetic induction (MI) is a process known in the art to be useful for transferring binary data through electrically generated magnetic coded pulsing. In this case, device 37 and BS 35 each have a magnetic sensor and a coil through which electric current is passed to create a magnetic field. In device 37 the sensor/coil implementation, known as a coil/sensor driver, is represented by element number 165. The coil/sensor driver illustrated in BS 35 is represented by element number 159. In this case, binary transfer is bi-directional. That is, certain data held in BS 35 is transferred to device 37 and certain data held in device 37 is transferred to BS 35 during one configuration process as illustrated by the four dotted arrows labeled binary data transfer.

In one embodiment, device configuration via MI technology is one-way communication from BS 35 to device 37. That is to say that all of the device information required to activate device 37 to the service is provided by BS 35. In this case, device 37 would not require a coil but only a magnetic sensor (magnetometer). Magnetic fields operate typically in this fashion over a very short distance, depending largely on the frequency and power used, and the apparatus in this case is made for short coupling. A user must power on device 37, and bring it close to BS 35 while BS 35 is powered-on. BS 35, by way of coil/sensor driver 159, transmits its digital information by means of applying a baseline field (created by passing a current through the coil). The baseline field is modulated in amplitude to code the bits needed for a binary programming sequence.

In this embodiment, the inventor allows for a possibility that device 37 may have data, perhaps supplied by the device manufacturer, that is required to be transferred to BS 35 as part of the configuration process. Therefore, MI technology as illustrated herein has bi-directional capacity. For example, a user wishing to configure device 37 brings device 37 within an acceptable distance (D) to the proximity of BS 35. Distance D should be less than a foot and both device 37 and BS 35 must be powered on. Assuming that first device 37 will transmit data, then one LED such as LED 167 will light (can be any color) indicating the beginning of data transfer. When device 37 is finished transferring it's data, LED 169 will activate indicating such.

LED 161 on BS 35 will then activate, indicating the beginning of it's data transfer to device 37. When BS 35 is finished transferring it's data, LED 163 will activate indicating a completed bi-directional process. Device 37 is, at that point, configured to BS 35 with BS 35 configured as master and device 37 configured as slave. In this way, sensitive information such as binary keys and the like would not be broadcast via RF and could not be intercepted by way of eavesdropping.

In an alternative embodiment an initiation button or switch is provided on one or the other (or both) of the BS and the S/A device, and an initiation process is performed each time an initiation signal is sent by the button or switch, as long as both devices are on and the devices are within the required range.

The method described above will not only relieve users of the need to set dip-switch settings after they purchase a new device, but will also allow every device in use to have a unique address that can be tracked and manipulated from such as server 27 of FIG. 1. The above-described method also facilitates waterproof casing designs for devices that need to be placed out-of-doors. Magnetic fields will permeate both non-magnetic metal and plastic housings such that a user is not required to open a device to expose any connectors or circuitry.

In practice of the present invention, there may times when it is not practical to bring an S/A device near a BS for configuration. An example would be that of an already mounted and wired S/A device sold with a new home-system such as a heating and air conditioning system. Disconnecting such a device in order to program the device through the MI process may be inconvenient for a user. Therefore, the inventor provides a hand-held proxy device (not shown), which may be battery powered and capable of obtaining data from a BS such as BS 35 and transferring it to an S/A device such as device 37 by proxy. The proxy device in this has the MI apparatus and system and sufficient memory to store data from either until brought near the other and then activated again.

Addressing Protocol Between Server and BS

Device identification and addressing data is required for configuring a device 37 to a BS. Data requirements for enabling an S/A device to practice the present invention may include but are not limited to a user number #, a device-type indicator, a device #, I/O actions and status indicators, and device data indicators.

It is presumed in this example, that data about a new S/A device is already known to the service before its connection and configuration to a BS. Such data, which will be described below, may be stored in a repository such as repository 29 of FIG. 1 and transferred in an address field to a requesting BS during configuration of an S/A device and during normal operation. However, during normal operation all data fields in the address may not be utilized. In one embodiment, such data contained in the address field may be transferred to a BS before an anticipated configuration process.

A user number in a preferred embodiment is a 32-bit security number generated by such as server 27 of FIG. 1 from a mathematical combination of a user's name and password.

Therefore no two user-numbers will be the same. Neither will user numbers be sequential, thereby enhancing security during RF transmission. A user number is encrypted with other data included within a device address field and sent to a BS from a server. A user number is transferred from a BS to an S/A device during MI programming and not by RF transmission. A user number allows devices to know who their master BS is, such that they do not respond to a wrong BS.

A device type is a 32-bit classification of a device such as device 37. This classification tells whether a device is, for example, in a designated "functional class" of devices, a "manufacturer's class" of devices, or a revision-level subclass of either one of the former classes in stand-alone version or in combination with each other. It will be apparent to the skilled artisan that there are many possible classification schemes that may be attributed to devices such as device 37.

A device # is in a preferred embodiment an 8-bit number designating a particular index number of a given device under command by a particular BS such as BS 35. For example, if there are three smoke alarms controlled by one BS then each S/A device associated with each alarm would be sequentially numbered such as device 9, device 10 and device 11. There can be up to 256 devices under command by a single BS since their numbers are contained within an 8-bit field.

Device data in a preferred embodiment is a 16-bit field of the address that contains data from the device to be sent to a BS, as well as programmed flag or threshold indicators from the BS for device re-setting (used in normal operation). For example, this section may contain the numeric reading of a value derived from an altimeter in a reporting sense from the device to the BS. This section could also be used to trigger an event should a connected temperature sensor indicate a temperature state above a pre-known threshold. This data is encrypted during subsequent RF transmission to devices using the well-known XOR encryption technique as described above.

I/O actions and status indicators are contained in a 16-bit field of the address. Such indicators identify all of the command data and status conditions of a particular device in terms of inputs, outputs and actions. These indicators are catalogued and maintained for all configured device-types at network level such as in server 27 of FIG. 1. Binary command data-sets (pseudo code) are developed by the service provider along with a manufacturer of a home-system or appliance which an S/A device is intended to compliment. For example, if a particular manufacturer provides a washing machine that is to be connected and registered as a home-appliance to the service, then that manufacturer and a manufacturer of an associated S/A device may agree that the particular washing machine will utilize certain modes. These modes may include but are not limited to a standard wash cycle, a standard rinse cycle, a super wash cycle, and a standard spin cycle along with standard power on and off modes. A list of created command codes is transferred to a target S/A device during the MI programming sequence. Subsequent user-initiated commands are transmitted via RF during normal use. In some cases, an S/A device may also e programmed via RF as long as the data is not sensitive as is a user number. Therefore, command lists may be transferred via RF as opposed to MI.

Once it is decided which modes will be available for remote monitoring and control, they are assigned individual binary codes that are contained in the 16-bit I/O actions and status field from which a BS issues specific commands that would employ these selected modes as described above. It should be noted here that some modes of a home system or appliance might be selected for remote control and monitoring while others will not. In some cases, all available modes to a system or appliance may be included. Such consideration depends on the system or appliance type and practical application.

The I/O actions and status indicators and device data indicators included in an address field for a given device are encrypted by XOR-ing the actual command bits in with an assigned user number. The user number is pre-programmed during the MI process described above and is never transmitted over the air (RF). Therefore, a user number cannot be intercepted by an unauthorized user operating an adjacent BS. Moreover, the above technique solves any BS conflicts that may otherwise arise from two devices belonging to two separate systems sharing a same ID number. During RF transmission between a BS and a S/A device, a cyclic reduction control (CRC) error correction method of 16-bits is used to insure all data is received by an S/A device during transmission.

Each and every device such as device 37 is assigned a unique ID number by such as server 27 of FIG. 1 and not a device manufacturer. This eliminates any possibility that a device can cause serial number labeling errors during the manufacturing of the device, and furthermore, will allow any server-generated ROM upgrades to be controlled. Each device also has an encryption key for decrypting RF data.

Figure 8:
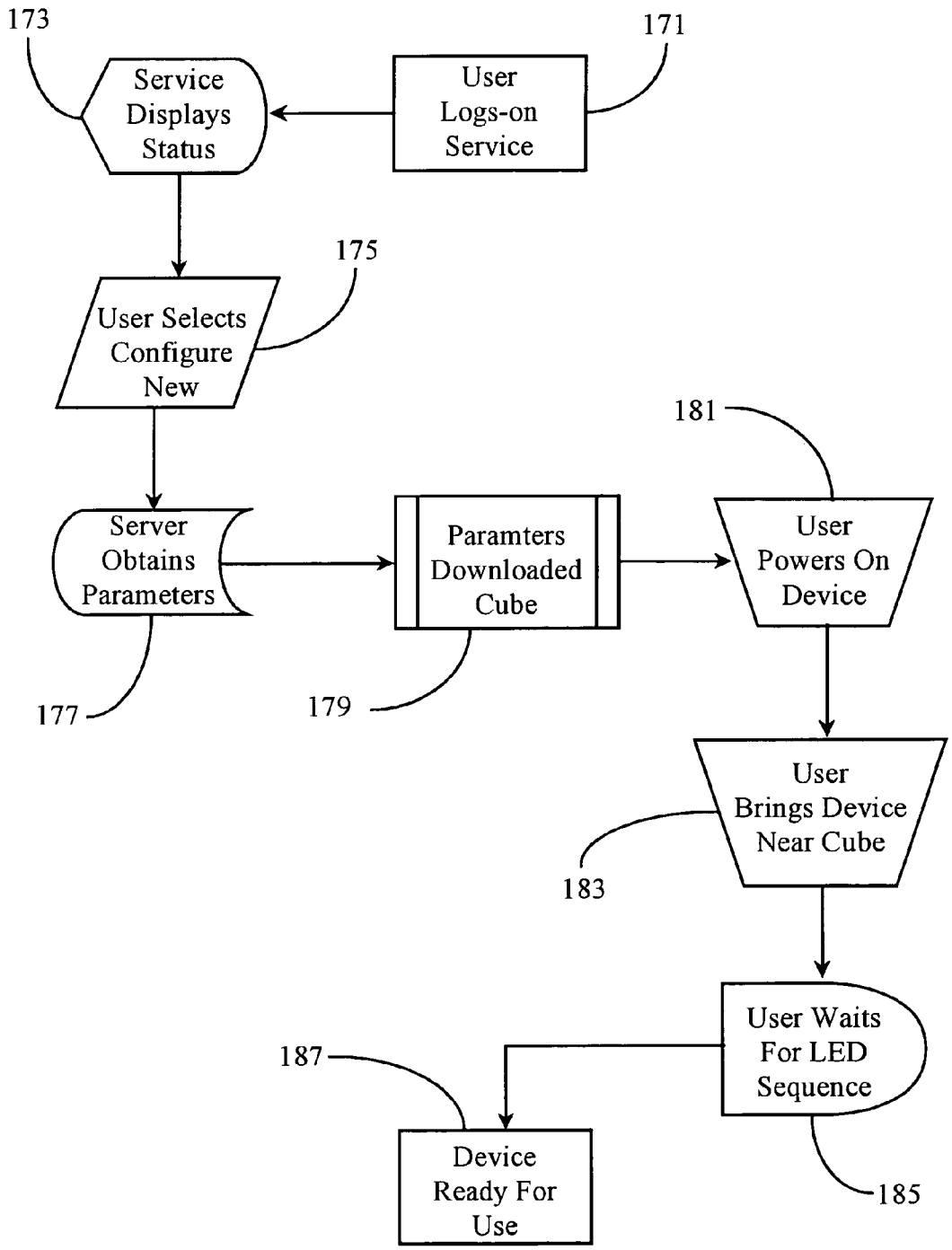
FIG. 8 is a process flow diagram illustrating logical steps for configuring a new sensor/actuator device to a base station according to an embodiment of the present invention.

FIG. 8 is a process flow diagram illustrating logical steps for configuring a new S/A device to a BS according to an embodiment of the present invention. In step 171, a user registered to the service logs-on to the service through an Internet appliance such as PC 33 of FIG. 1. SW provided as a plug-in to a browser interface enables smooth and seamless operation and interaction.

At step 173, a status web page is displayed in a user's browser window. Such a page allows a user to monitor already-registered and active systems or appliance operations, initiate and effect setting changes, and to configure a new S/A device or devices to the service. At step 175, a user selects (via mouse click or keyboard entry) an option to configure a new device. It is assumed here that in this step, a user enters an authentication number for the device to be authenticated and identified at such as server 27 of FIG. 1.

In an another embodiment, such authentication may be automatic during a fist step of a MI programming sequence. In either case, authentication must be performed in order for a server such as server 27 of FIG. 1 to obtain the standard data stored for a particular device. In this example, as will be evidenced by the order of steps 181 and 183, authentication is performed manually by data entry. Authentication of an S/A device should not be confused with a user number given to the device for the purpose of teaching the device which BS to respond to during RF transmission.

An S/A device may be, in some embodiments, a universal device adapted for more than one standard home-system of appliance. As such, authentication would be required if such a device is purchased "dumb" and then enabled by a server through field programming. In this respect, authentication allows the server to find the data listed under the authentication number. At that point, a user may select which data to download for the particular implementation of the device.

At step 177 a server such as server 27 of FIG. 1 retrieves or obtains device parameters specific to the particular device to be programmed based on receipt of authentication. Such data may be held in such as repository 29 of FIG. 1 or any other connected data store adapted for the purpose. At step 179, the device parameters are downloaded to the commanding BS such as BS 35 of FIG. 7 (cube).

At step 181, a user powers on the device targeted for programming if not already done in a first step for MI authentication in the event a user relies on the device to authenticate itself and does not manually enter authentication data. At step 183, a user brings the target device near the commanding "cube" if not already performed as described above. At step 185, a user waits for an LED sequence associated with MI programming to complete. At step 187, the target device is configured to the service and ready for normal use. After completing step 187, a user may set initial settings for a target device by such as the method described in FIG. 6.

Steps 181 and 183 may be performed before step 177 if device self-authentication is possible. If not, then it is assumed authentication is made through interaction with a host computer such as PC 33 of FIG. 1. Such data entry would be performed in step 175 as described above.

It will be apparent to one with skill in the art that the process steps illustrated herein may be of differing order and description without departing from the spirit and scope of the present invention. For example, steps 181 and 185 may be performed before step 177 as described earlier. An automated device-authentication step may be practiced such that it is not part of a main MI programming sequence. For example, by powering on both a S/A device and a BS, bringing them close together, and depressing a button on a target S/A device, a separate unidirectional MI sequence may take place that transfers authentication from a device such as device 37 to a BS such as BS 35, at which point, the authentication data or key would be uploaded to a server such as server 27 allowing step 177 to be initiated. There are many possibilities.

Inter-Business to Client Relationship

According to a preferred embodiment of the present invention, a service provider, defined herein as a company which provides and maintains the service of the present invention, including provision and maintenance of the novel communication equipment and architecture enabling the service as taught in this specification, maintains control and direction of other participating entities through licensing of the technologies used for enabling a communication network used in the service, and also, through licensing of system and appliance manufacturers to create and provide new systems or appliances that use the methods and apparatus of the present invention. Therefore, a unique inter-business relationship is created and refined to that end. Such an inter-business relationship and its effect on a common customer-base is described below.

Figure 9:
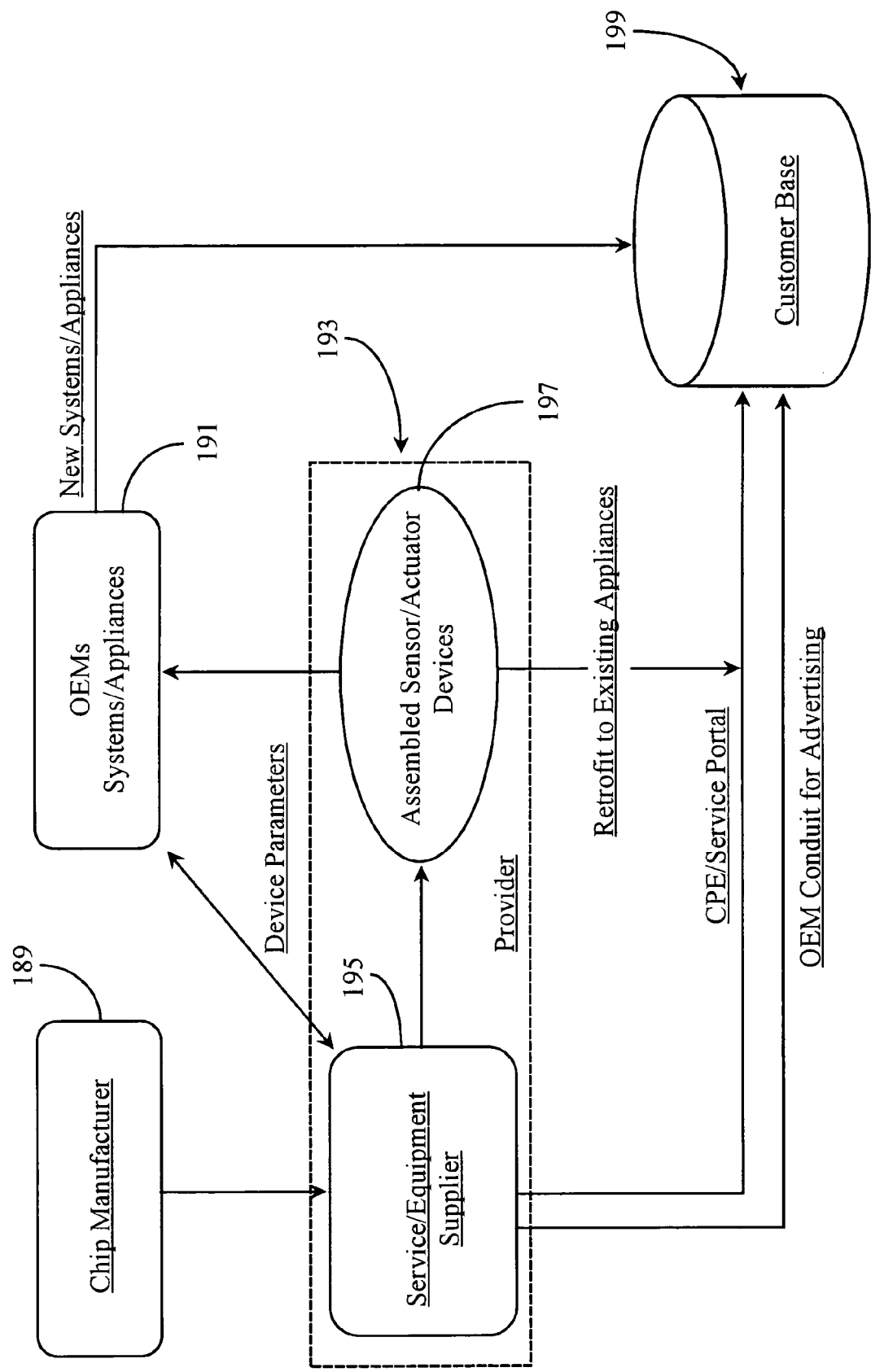
FIG. 9 is a block diagram illustrating a functional business relationship between various entities providing service and/or equipment and their relationship to a common customer base according to an embodiment of the present invention.

FIG. 9 is a block diagram illustrating a functional business relationship between various entities providing service and/or equipment and their relationships to a common customer base according to an embodiment of the present invention.

In the following example, the inventor illustrates a model describing a functional business model envisioned to exist between a provider 193 and participating entities, illustrated herein as a chip manufacturer 189, and various original-equipment-manufacturers (OEM's) 191, which may, through agreement, be pre-disposed to adopting the methods and apparatus of the present invention.

Provider 193 includes a service/equipment supplier 195, which may be a division of provider 193. Provider 193 is the author of the described method of practicing the present invention and controller of proprietary apparatus required practicing the present invention. Service/equipment supplier 195 then would be a customer-interface arm of provider 193. Provider 193 controls internal production and distribution of sensor/actuator devices 197.

Chip manufacturer 189 supplies provider 193 with the required RF communication chip-sets for BS and S/A device implementation. In one embodiment, special RF chip-sets may be developed by provider 193 instead of being pur- chased. Such chip-sets would be designed to enhance the practice of the present invention. Such RF chip-sets would not require some of the circuitry or technologies used in telephony applications for which RF chip-sets are mainly intended. Manufacturer 189 may be any one or number of suppliers chosen by provider 193.

Service/equipment supplier 195, which is part of or a division of provider 193, uses various selected suppliers and it's own manufacturing and assembly facilities (not shown) to build and/or modify integral pieces used in practice of the present invention. For example, BS systems may be acquired from a supplier and then modified to practice the present invention. S/A devices are, at least, initially assembled at the location of provider 193 using parts that are proprietary to provider 193 such as some sensors, circuitry and so on. Assembled S/A devices 197 are produced by supplier 195, which is a division of provider 193 as illustrated by a directional arrow emanating from supplier 195 and progressing toward devices 197.

Service/equipment supplier 195 provides service through the Internet to customers represented herein by an illustrated customer base 199. This is demonstrated by a directional arrow labeled "CPE/service portal". This portal, which uses the Internet as a conduit, represents a data-communication interface from provider 193 to all customers 199. Customers 199 may purchase equipment, obtain technical service, and monitor their home systems and appliances through the above-described portal.

In one embodiment, a CPE/service portal may also include an "OEM conduit for advertising". More detail about OEM advertising to customers is provided below.

Some of devices 197 are used for retrofitting to existing customer-owned home-systems or appliances such that they may be included in practice of the service of the present invention. Some devices are supplied to OEM's for inclusion into new systems or appliances. Using devices supplied by provider 193, OEM's 191 may provide new systems and appliances equipped to practice the present. Such new systems or appliances purchased by customers would include software and instruction for registering with the service of the present invention.

By providing devices directly to customers for retrofitting to existing systems and appliances and by providing devices to OEM's for integration in to new systems and devices available to consumers, provider 193 may effectively control both markets for RF enabled home systems and appliances.

In many cases, universal S/A devices may be offered that may be configured to more than one single system or appliance or more than one brand of such appliances. For example, provider 193 may market such a device that may be configured to a variety of "makes" of like appliances such as, perhaps, several different brands of washing machines as well as the same brands of dishwashers. In this way, a user may swap one S/A device from a washing machine to a dishwasher if so desired. Device programming would be re-flashed with new instruction from such as server 27 of FIG. 1 when configuring for the latest appliance. Extra wiring terminals on such devices would allow for more or fewer wiring connections as may be required with different appliances. Such standardization may be practiced at least on a limited scale.

Device data and development parameters and rules for new S/A devices may be developed jointly by provider 193 and any participating OEM 191. For example, S/A programs (flashable firmware) developed for new "dumb" universal devices provided to an OEM for redistribution or manufactured by the OEM for direct sale through license are sent to provider 193 (if developed by the OEM) and stored in such as repository 29 of FIG. 1 where they may be accessed during customer configuration of a "dumb" device to an actual system or appliance. In this way, new device parameters are known before customer purchase.

In another embodiment, device parameters and instruction programs required for a device to control a system or appliance may be included with the device at sale such that only configuring the device for radio addressing and communication on the network is required. Devices that are sold "smart" or already having parameters and instruction included may still be erased and re-programmed with server held instruction if the device is adapted as a universal device.

Conduit for Direct OEM Advertising

Referring still to FIG. 9, Provider 193 may, under agreement with OEM's 191, provide an Internet conduit through portal services for OEMs to advertise their products and services to customers 199. For example, when registered user's log-on to monitor or change settings to various registered systems or appliances, streaming ads may be sent to them by OEM's offering RF-equipped systems or appliances and services. Such advertisement may be caused to appear in a same web page used by a customer 199 to configure, monitor, or change settings. The ability to purchase products and services offered by provider 193 and any authorized OEM's 191 directly from a customer's interface may also be provided.

Rules dictating the method, intensity, and which OEM's may advertise to which customers 199 may be controlled by provider 193. For example, if a customer already uses systems or appliances specific to a particular OEM 191, then that particular OEM may enjoy an exclusive conduit for advertising updated systems, service, and additional products that a customer 199 has yet to purchase. If a customer has systems or appliances specific to more than one OEM, then competition may be encouraged such that a customer may compare pricing and service. The opportunity for such direct advertising may be an incentive for OEMs to equip new systems and appliances with S/A devices supplied by provider 193 or manufactured by the OEM by virtue of license. There are many possibilities. The business model represented herein by FIG. 9 can be summarized and standardized as follows:

1) A provider offering and maintaining the service and CPE of the present invention sells equipment, software, and service to clients wishing to automate and remotely control home systems and/or appliances.
2) The provider, through agreement with various OEMs supplying systems and appliances that may be adapted to practice the present invention, supplies equipment, software, and licensed technology such that the OEMs may create and offer new systems and appliances to a common customer base.
3) Customers acquiring new RF-equipped systems or appliances from OEMs register such equipment and appliances with the service provided by the provider.
4) OEM participation rises naturally as a result of a growing customer base already practicing the present invention, and concertedly through incentives which include an Internet-based conduit for direct advertising to service-registered customers.
5) OEM's through agreement with home building contractors may create and supply new "Smart Home" systems using RF capability instead of mass cabling structures wherein such systems and components thereof may be of one manufactured source through licensing by the provider.

It will be apparent to one with skill in the art that the method of business described above may be tailored somewhat by design and purpose of a provider without departing from the spirit and scope of the present invention. However, in a preferred embodiment, the provider shall maintain control over servicing clients through such as an Internet portal-interface and any OEM advertising activities allowed through such a portal. Licensing to OEM's of technologies and rights to manufacture may be separately negotiated with each OEM without departing from the spirit and scope of the present invention.

In many cases such OEM's will not be natural competitors to each other such as might be the case with two or more OEM's manufacturing like products. For example, a lighting system manufacturer and a watering system manufacturer would not compete for business. In situations where two or more competing OEM's are licensed by the provider to manufacture RF-equipped systems or appliances, the provider may encourage natural competition by allowing both OEM's to advertise directly to customers through the portal maintained by the provider.

System Planning, Control and Implementation Service

The present inventor is aware that there are a number of existing home monitoring systems and protocols on the market at the time this patent application is submitted. These are largely hardwired systems, and typically communicate in the home or business with a home station or base station, such as a PC. In some cases these systems communicate by special wiring, in others communication is imposed over the local power wiring, and so on. In each of these proprietary systems the way control and sensor units interface to various systems and appliances is different, the communication with a central control is proprietary, and, in most cases, there is no ability to monitor and control the home or business-based systems from a remote location, such as by interfacing through a customized Internet page, as described above in embodiments of the present invention.

The present inventor is aware, as well, that many such systems have been implemented in homes and businesses, and that the owners and users of most such systems have no Internet access and control for their systems. It is an object of the invention to provide a way to access and control such existing systems via the Internet.

The inventor is aware as well that there are many potential customers for home monitoring and control systems who may hesitate to purchase and implement such systems because there is little reliable information as to which systems and protocols may better serve under what circumstances, little comparative pricing information, and very little information available for planning, installation aid, debugging, and troubleshooting such systems. It is a further object of the present invention to correct this lack, and to provide an Internet-based service through which a client may plan and build a virtual system, selecting from a broad variety of commercially available equipment; may then purchase the necessary units and components through the same service, and then may rely on the service as well to guide the client through installation, testing, and debugging; and then may activate and access and interact with the resulting system both locally and remotely, as described above.

For the case of a client having an existing, working, and installed home system, the present inventor provides, through server 27, a system wherein the client may build a personalized home page on server 27 to interface with his or her installed and working system. The working of this service may be described with reference to FIG. 1.

In this embodiment it may be assumed that the client at user premise 15 has an existing and working system represented generally by base station 35 and S/A units 37. In this case the apparatus of the S/A appliances may vary widely, and there may or may not be a base station 35. In the existing system the S/A units may communicate directly with PC 33, for example. In any case, the protocol and PC interface for sensing and control for the existing system will be known and will conform to some manufacturer's proprietary protocol.

In this embodiment, the client may access a special page at server 37 for creating an Internet-based control interface for his/her existing system. In the process, after registering with the service and making initial arrangements, the client is offered a configuration interface, allowing the client to enter the manufacturer's name and perhaps model numbers of the existing system; and the number and nature of local controlled appliances and systems. The offered service at server 27 has pre-programmed information and data for as many commercially-available systems as practical.

In the creative process the client is guided step-by-step, and creates monitoring and control interfaces for each appliance and local system, which are stored and accessible in a client's personalized page. In most cases the client is then provided with (downloaded to the client) a software interface for the client's PC, which interfaces with the local system's existing software on the client's PC. Once the provided software is installed and initialized, this client can thenceforth access his/her page at server 27 from any Internet-capable appliance and interact with his/her home monitoring and control system, just as described above for systems according to other embodiments of the present invention. Thus clients having existing systems are accommodated and served in embodiments of the present invention.

In a further embodiment, for those persons (potential clients) who do not have an existing system, a service is provided through server 27 for virtual creation of a home system, and then for purchase, installation, testing, and so forth.

In this embodiment a client indicating a desire to create a virtual home system, after suitable registration and the like, is offered a graphic interface wherein the client may browse existing hardware and protocols, and the like, and become familiar with what is offered. This client may then enter, using existing templates in many cases, the nature and characteristics of the home appliances and other systems the client may wish to monitor and control.

As an example, this client may enter particulars about an existing heating and air-conditioning system, and identify S/A units available that may be physically interfaced to the heating and air-conditioning system. The client may then select an appropriate S/A unit and configure a monitoring and control interface for the resulting virtual unit. Similarly the client may browse for commercially-available video monitoring and other security equipment, and select such equipment as well for inclusion in the new virtual system. In like manner the client may continue to create a complete virtual system for the home or system.

When the virtual system is complete, the client may practice with the personalized interface resulting and become familiar with the operation and control characteristics of the overall system. One the client is ready, the system at server 27 will create an entire bill-of-materials for the system, lead the client through pricing and the like, and the client may then order, in most cases, all the necessary equipment and paraphernalia necessary to implement the system. A project is then opened for the client. When the equipment arrives at the client's premise, complete instructions and guidance is made available through the client's personalized page at server 27 to guide the client in installation, activation, and testing for all of the equipment and systems at the client's premise.

Once installation is complete, in a preferred embodiment the client is further provided with testing and debugging guidance and procedures, and once the system at the client's premise is operable and tested, the client may then operate either locally or through the Internet as in other embodiments described above.

It will be apparent to one with skill in the art that the method and apparatus of the present invention may be practiced on the Internet or other suitable data-packet or other high-speed, broad band data network without departing from the spirit and scope of the present invention provided correct transfer protocols are used and supported. Moreover, the method and apparatus of the present invention may be adapted for both home and business use. There will also be a broad spectrum of users who have varying degrees and levels of home automation in place, and it will also be apparent to one with skill in the art that all the concepts presented herein will be as useful to the novice as they will be to the expert. Any premise, including mobile platforms, that may have systems or appliances stationed therein with such systems and appliances being configurable to device, system, and service of the present invention may be included under the scope of the present invention.

Application to Vehicles

In a further embodiment of the present invention the principles and functions of this invention taught in other embodiments above are applied to vehicles, such as personal automobiles and commercial cars and trucks. In this embodiment S/A units are provided and integrated with components of the target vehicle, such as the engine, the transmission, the gas tank, the speedometer and odometer, and so forth. In this embodiment the sensing aspects may be ascendant, as it makes little sense to control a vehicle's speed, for example, from a remote location.

Using a vehicle as an analogy to the home or business location as used in exemplary embodiments above, essentially all of the functions described in the other embodiments may be applied in one form or another, and it will be apparent to a skilled artisan, given the many embodiments described above, how this may be done.

Video Capture and Control

With a centralized home automation web site as taught in several embodiments of the present invention described above, a video capture and control capability service is provided in a further embodiment. In this embodiment the user sets up a small CCD (or other digital camera) system and hooks it up to a digital capture and conversion box, then video info (single or multiple frames) is captured and uploaded to the web site of the subscription service for storage and review. Several add-on services are then provided by the service, using the captured and stored images. For example, in one embodiment the service monitors new images and compares them to recently acquired images, or at least the last image received. If an image does not change, no action is taken, but if the image changes, an alert is generated for the user. The user may be paged, telephoned, or alerted in another manner, that an image has changed.

Also, there are many other useful algorithms that can be run from the web site once target systems are in place at the user's home or business. For instance, if the user has a watering system, then the web site can tap into macro weather information (available on the web) and automatically adjust their watering times to conserve water and optimize grass or plant health. In this particular case, there is an algorithm that somebody has already developed that saves a user up to 57% of their monthly water usage and additionally yields healthier plants within this overall conservation.

It will also be apparent to the skilled artisan that there are many alterations that might be made in embodiments described without departing from the spirit and scope of the invention. For example, in the service described above wherein a client may create a virtual system through an Internet interface, there are a broad variety that the needed graphic interfaces may take. The detailed nature of these interfaces, using known operations and icons and the like, are not limiting in the invention. There are similarly a broad variety that home control and monitoring systems may take, and many ways the unique functions of embodiments of the invention may be programmed.

RF Receiver/Transmitter

In one aspect of the present invention, a modular R F module is provided to be integrated with distributed sensor/actuator devices and in a controlling base-station in a plug-in-play fashion.

Referring now to FIG. 4, S/A device circuitry 37 contains an RF section 101 having an RF chipset 105, an RX block 103, and a TX block 107. It is assumed in this example, that RF section 101 uses a separate antenna (not shown) for both receive and transmit functions. An input/output (I/O) dataport is not illustrated in association with RF section 101, but may be assumed to be present. Referring also to FIG. 3, BS circuitry 35 contains an RF section 85 having an RF chipset 95, an RX block 93, and a TX block 97. R F sections 101 and 85 may be assumed to be identical sections, one of which, is implemented within an S/A device, the other, within a base station. Neither section 101 or section 85 contains a microcontroller or processor. Similarly, neither section contains a provision for memory. Each described section, must utilize available processing power provided and each unit.

It can be seen in the examples of FIG. 3 and FIG. 4, that RF section 101 is a slave device while RF section 85 is a controlling device. Section 85 uses processor 79 and associated memory blocks 87-91 or computing power and for accessing needed data such as network-path tables communication protocol and the like. RF section 101 of FIG. 4 uses microcontroller 117 to aid in its function. As was previously described, addressing and other protocols required for successful communication and operation of S/A device 35 and similar devices are provided initially through magnetic-induction (MI) technology, and subsequently through RF communication from BS 35 of FIG. 3 based on input from a remote control location wherein the input is received through I/O circuitry 77 and then broadcast (via controlling RF section 85).

It is an object of the present invention to provide an RF module that may be integrated with circuitry 37 and circuitry 35 in a modular fashion. A goal of the present invention is to eliminate much of the complexity associated with addressing and network optimization that exists when there are a plurality of slave RF modules communicating with one master RF module in a communication cell. The method and apparatus of the present invention will be explained in enabling detail below.

Figure 10:
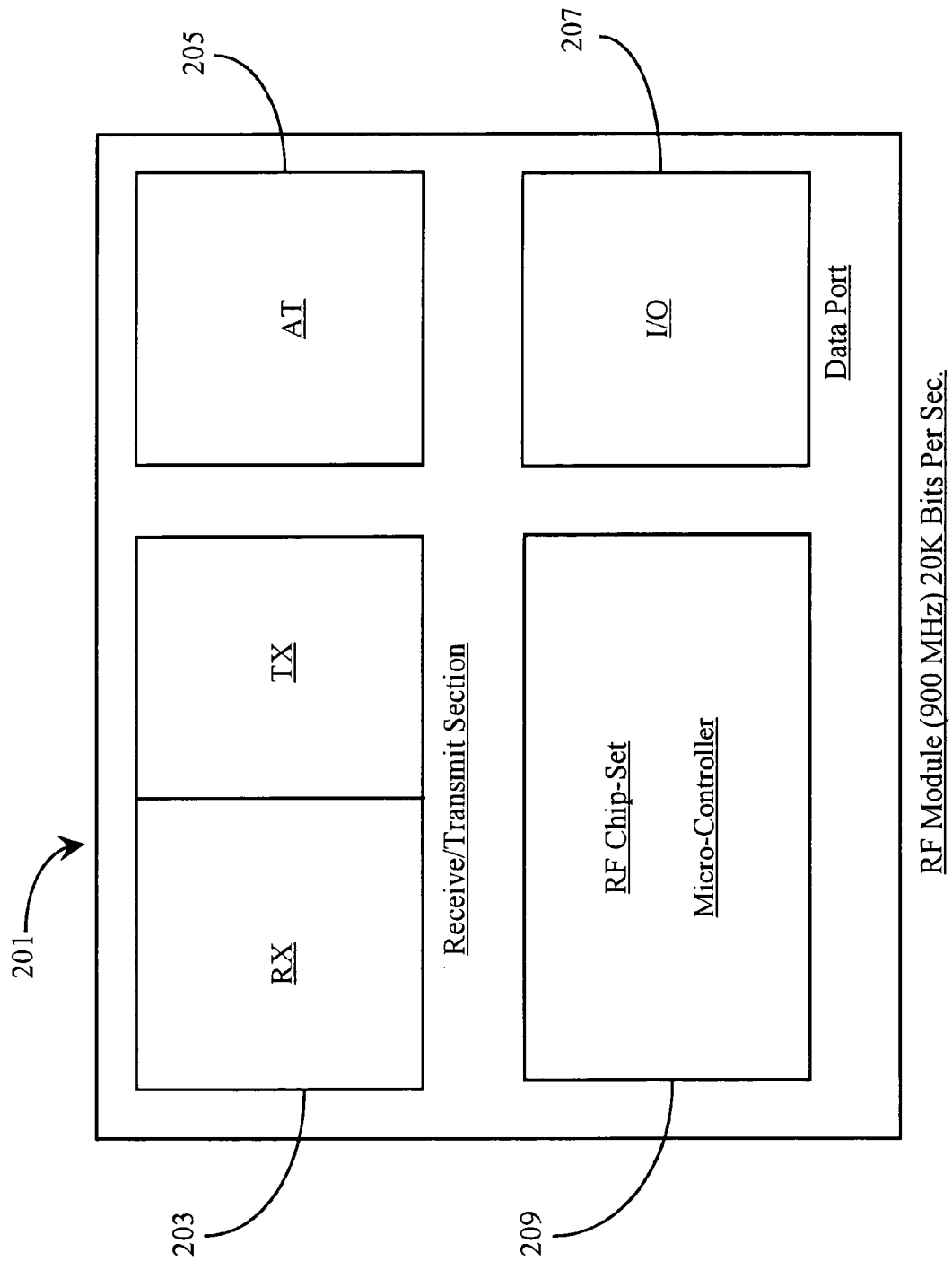
FIG. 10 is a block diagram illustrating components of a modular RF module according to an embodiment of the present invention.

FIG. 10 is a block diagram illustrating components of a modular RF module 201 according to an embodiment of the present invention. RF module 201 is provided and adapted to be modularly compatible with an S/A device 37 or with a BS 35 as was described above. Module 201 contains a receive/transmit section (RX/TX) 203, which may be assumed to contain all of the required circuitry for enabling RF transmission and RF reception. In this example, section 203 utilizes a single antenna block 205 for both signal reception and signal transmission functions. Providing a single antenna 205 allows less circuitry to be employed within module 201.

A RF Chipset Microcontroller 209 is provided within module 201 as an on-board processor with built-in RF/IF circuitry. A preferred embodiment, the R F chipset portion of microcontroller 209 is constructed using ASIC technology. In another embodiment, the RF chipset portion of microcontroller 209 is a discrete device. In yet another embodiment, which may be a preferred embodiment in many applications, RF chip-set 209 contains receive/transmit section 209 and antennae circuitry 205 along with a micro-controller packaged as a single modular device. A dataport (I/O) 207 is provided and adapted to allow serial communication between module 201 and other components associated with the S/A 37 of FIG. 1, or BS 35 of FIG. 1. Dataport 207 provides a means for controlling RF module 201.

In a preferred embodiment of the present invention, module 201 is modular and identical to other modules 201 distributed in a communications network whether or not they are installed in a BS or in a S/A device. It is assumed herein, that BS 35 will retain status as a master system communicating to a plurality of slave devices during active data transmission as described with respect to FIG. 1.

In a preferred embodiment of the present invention, module 201 operates on a 900 MHz or 2.4 GHz frequency, which is a standard public band for communications products. Other like public frequencies may be used for transmission. The available bandwidth for data transmission from module 201 is, in a preferred embodiment, limited to 20 kbps or less. This limitation lowers the cost of underlying electronics, and increases transmission range associated with module 201.

Module 201 functions, in certain situations, in an independent mode as a peripheral device to which communication to it from an original equipment manufacturer (OEM) may follow any one of a number of standard protocols such as asynchronous ASCII, service-provider-interface (SPI), 12 C, and so on. For example, an OEM may transfer data to module 201 by simply writing the data to I/O 207. Similarly, data may be transferred to an OEM in the same simple manner. It is noted herein, that data from an OEM would be communicated first to module 201 within BS 35 by virtue of an available Internet connection, telephone connection, or serial connection to a host computer. Data designated for slave devices is, of course, transmitted via respective RF modules 201. Conversely, data originating from an automated system or device and destined for an OEM is transmitted to BS 35 whereupon it may be passed as digital data by virtue of the above-mentioned porting or connection means.

Referring now back to FIG. 10, microcontroller 209 within module 201 is responsible for controlling transmit and receive section 203 by turning one on and the other off in automated switch mode. Error correction algorithms such as the Manchester™ encoding scheme are stored in microcontroller 209. Controller 209 also provides a redundancy-based networking protocol. Such a protocol allows for a state wherein if one device is out of communication range with a BS, another device may intercept data packets on behalf of the out-of-range device and act as a repeater device re-transmitting the data packets to the target device.

According to the protocol described above, module 201 may temporarily function in an independent mode when it is not actively sending or receiving data packets. For example, it may be assumed that the user will have multiple automated systems and/or appliances distributed throughout a communications cell area. Therefore, some of the multiple RF modules may be arranged such that they are outlying with respect to a given cell range and are experiencing poor point-to-point reception with a controlling base station module. A module experiencing poor point-to-point reception may request that another module act as a signal repeater so long as that module is not actively communicating with a base station. This technique may be accomplished by virtue of an algorithm, as described above, and can greatly enhance communication ranges for all modules within a local cell area.

In one embodiment, several intermediate modules may become repeaters for both an outlying module 201 and a controlling module 201 associated with a base station. Module 201 as described above, is intended to be a modular device capable of being dropped into any S/A device or controlling BS. A fact that module 201 is self-contained allows efficient and simple installation and programming.

It will be apparent to one with skill in the art that and RF module such as module 201 may be provided of a variety of bandwidth capabilities and sizes depending on the implementation requirements of a given wireless network. It is intended by the inventor that module 201 does not depend on a host device for RF function. However, processing power generic to a host device will, of course, be utilized for the purpose of communicating various states of systems, states of appliances (slave device), commands from OEMs and user originated commands (master device) for transmission using RF functionality.

Figure 11:
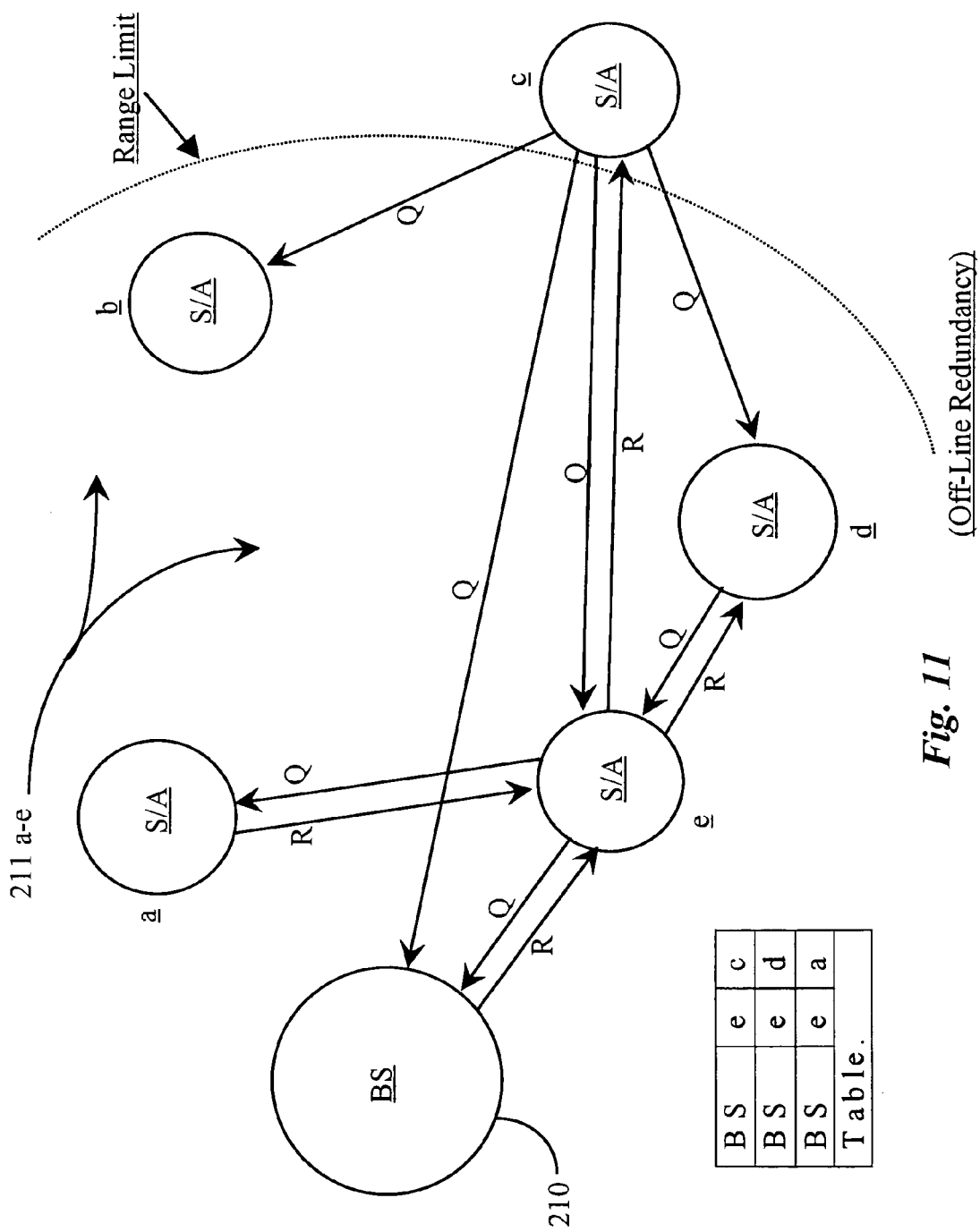
FIG. 11 is a block diagram illustrating a capability of an RF module for operating independently in an off-line mode for the purpose of determining optimum network paths according to an embodiment of the present invention.

FIG. 11 is a block diagram illustrating a capability of module 201 for operating independently in an off-line mode for the purpose of determining optimum network paths. In this example, a base station (BS) 210 is illustrated in configuration with a plurality of sensor/actuator devices (S/A) 211 a-e. BS 210 and S/A device is 211 may be assumed to be analysis to BS 35 and S/A device is 37 of FIG. 1 except for inclusion of a module 201 in each (module not shown). A range limit for BS 210 is illustrated herein by a dotted arc labeled Range Limit.

As described in FIG. 10 above, module 201 may act in an independent mode in order to help solve redundancy problems and are typically experienced with devices setup in a cell range of a wireless network. In this example, devices 211 a-e may be assumed to be set-up and configured to their respective appliances or systems. It is noted herein, that device c this setup just outside of a range limit of BS 210. Therefore, it may be assumed that devices c may experience poor point-to-point reception with respect to BS 210.

According to algorithm and protocol generally described in FIG. 7 above, S/A devices 211 a-e may function as independent devices during an off-line mode for the purpose of establishing optimum point-to-point network paths or communication. The same is also true with regard to BS 210. For example, SA device c may query other devices including BS 210 during an off-line period when there is no traffic in the network. These queries are represented herein by directional arrows labeled Q emanating from device c and leading forward device d, e, b, and BS 210. Each query sent out by device c is intended to elicit a response, which will be measured by device c to determine the quality of transmission. The quality of each response is determined by measuring bit-error rate and received signal strength.

All other devices 211 may also function independently sending queries and measuring responses in order to determine optimum transmission paths. It is noted herein, that each device 211 functions as a master device in turn and in cooperation with all other devices. For example, during an offline state of the network, device c may be the first device authorized to send queries and measure responses. When device c has completed it's process, device d may then begin sending queries and measuring responses. The process repeats with each device until devices have accomplished their goal.

In this example, device c has sent 4 queries as previously described. In this case, device e was the only device to respond to device c. Device e has sent queries to BS 210 and to device a. Device e has received responses from both BS 210 and device a. A query and response pair is also illustrated between device d and device e. In this example, device e has optimum transmission quality with BS 210. Optimum transmission quality has also been established between device e and devices a, d, and c. As mentioned before, the query response process continues until all devices have sent queries and received responses. A table is constructed from the results of this process. A portion of such a table is illustrated at lower left in this example. BS is illustrated in the first column, S/A device e is listed in the second column as a repeater device for devices c, d, and a listed in the third column. According to response results, device e is designated as a signal-repeater device capable of intercepting transmissions destined for device c and re-transmitting the data. In this way, network redundancy maybe optimized for the system as a whole.

In a preferred embodiment, each device 211 a-c has a multiple optimized paths listed in a table shown herein. Each optional path is additionally rated according to quality such that if the best path is unavailable for any reason the next-best path will be utilized in a given transmission. Moreover, the above-described capability of accessing a path determination table (determination access algorithm), allows a user to physically move and redistribute modules within a cell area such that upon redeployment and activation, each module would help rebuild the transmission-path lookup-table again.

It will be apparent to one with skill in the art, that the method described above is enabled by virtue of the fact that each module 201 possesses its own on-board microcontroller. It will also be apparent to one with skill in the art at the method and apparatus of the present invention may be employed with a communication cell having more than one BS 210.

The method and apparatus of the present invention may be applied to virtually any classification of wireless-local-loop system without departing from the spirit and scope of the present invention. Examples include CDMA, TDMA, FDMA, and so on.

Distributed HAC Window

In one aspect of the present invention, remote home-automated-control (HAC) capability is extended beyond a single Web-site interface to other Web locations frequently visited by users. Such Web-locations are defined in this specification as interactive Web-sites frequently visited by users where users may spend a considerable amount of time, such as Web-search portals, on-line investing sites, shopping sites, and so on. Extended control is accomplished through implementation of a functional control window which may be distributed and implemented within any Web interface.

Figure 12:
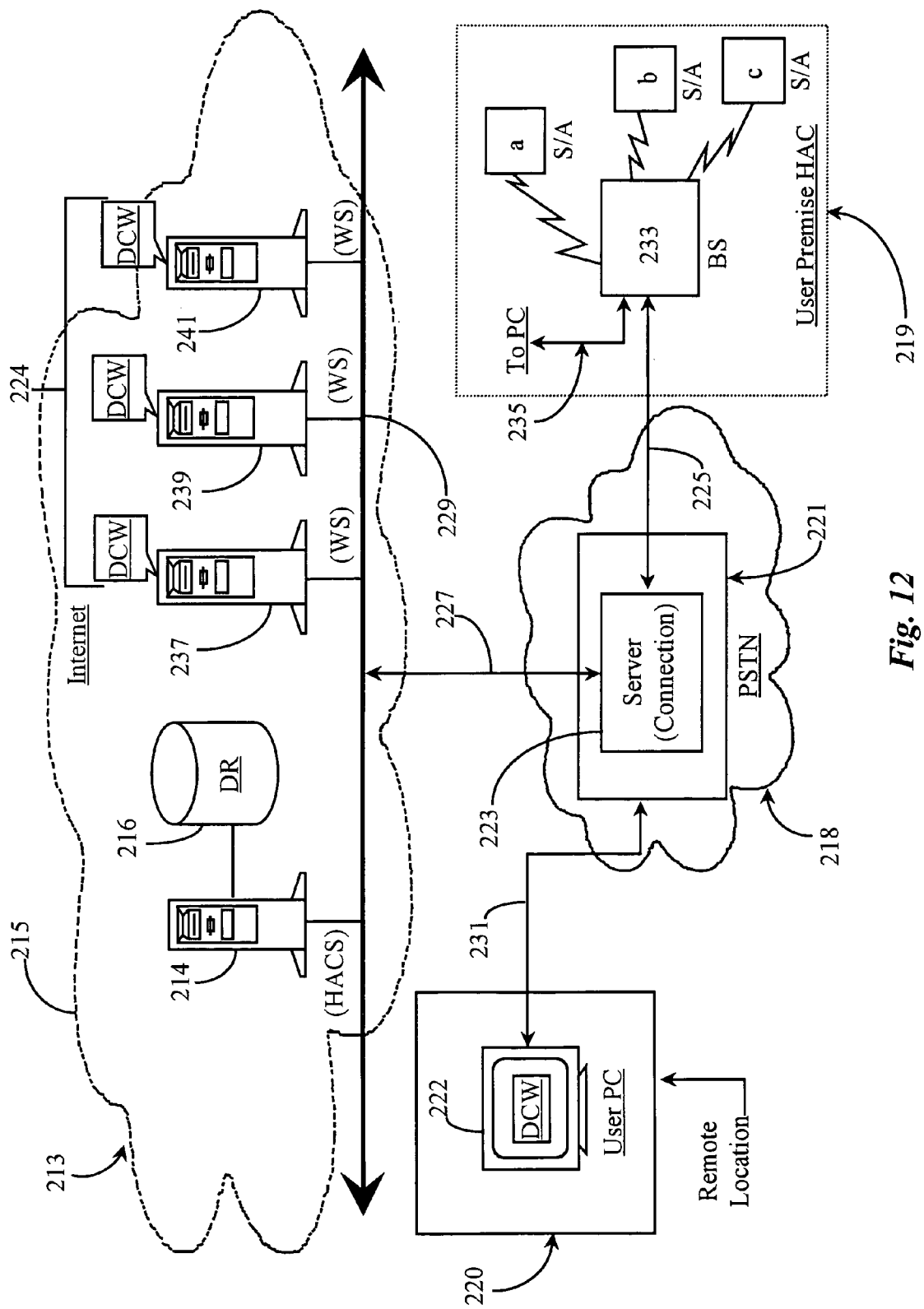
FIG. 12 is an overview of a communications network practicing distribution and implementation of distributed control windows according to an embodiment of the present invention.

FIG. 12 is an overview of a communications network 213 wherein distribution and implementation of distributed home-automated-control windows (DCW) is practiced according to an embodiment of the present invention. Network 213 comprises a data-packet-network 215, which in this example is the well-known Internet network, a telephony network 218, which in this example is a public-switched-telephony-network (PSTN), a user premise 219, and a remote-access location 220.

Internet 215 may instead be a corporate wide-area-network (WAN), an Intranet, or any other type of DPN that supports communication protocols such as transfer-control protocol/Internet protocol (TCP/IP). The inventor chooses Internet 215 as a preferred example mainly because of a high public-access characteristic. PSTN 218 may instead be a private telephone network. The inventor chooses PSTN 218 as a preferred example mainly because of a high public-access characteristic. The choice of Internet 215 and PSTN 218 as data mediums should not be construed as a limitation of the practice of the present invention, but rather as a preferred example using optimum mediums for communication.

User premise 219 may be assumed to be a user's home or another location maintained by a user, such as a business site. Illustrated within user premise 219 are a base station (BS) 233 and a plurality of sensor/actuator (S/A) devices, illustrated herein as device a, device b, and device c. As described above and in reference to the related applications listed in the cross-reference section, S/A devices a-c communicate with BS 233 via a wireless RF technology such as CDMA. It may be assumed in this example that S/A devices a-c each control an automated system or appliance resident within user premise 219 and configured to the service of the present invention. BS 233 in this example has direct Internet capability which is illustrated herein by an Internet connection line 225. A data cable 235 illustrates a connection between BS 233 and a PC (not shown) for allowing control of home-automated-systems or appliances wired to S/A devices a-c. In one embodiment BS 233 utilizes a connected PC as an Internet host instead of having direct Internet capabilities.

Illustrated within PSTN 218 is an Internet-Service-Provider (ISP) 221. ISP 221 is adapted to perform normal Internet connection services as is known in the art. In this example, a connection server 223 provides Internet access services to BS 233 over Internet connection line 225. Line 225 may be a normal telephone line, or a digital carrier line such as an integrated-services-digital-network (ISDN) or a digital-subscriber-line (DSL). An Internet access line 227 provides Internet-access capability between connection server 223 in ISP 221 to an Internet backbone 229 within Internet 215. Internet backbone 229 represents all of the lines, connection points, and equipment that make up the Internet network as a whole. Therefore, there is no geographic limitation to the practice of the present invention.

Remote location 220 is a remote user location such as an office location or some other location frequented by the user of premise 219. A user PC 222 is illustrated within remote location 220 and exemplifies any Internet-capable appliance that may be configured to practice the present invention. The only requirement of appliance 222 for practicing the present invention is that it is capable of accessing the Internet and displaying an electronic information page. In one embodiment, location 220 may be a user's person and appliance 222 may be a wireless Internet-capable appliance.

A home-automated-control-system (HAC) server 214 is illustrated within Internet 215 and connected to backbone 229. HACS server 214 is adapted as a main server for interface to all subscribers of HAC services. Server 214 is analogous to server 27 of FIG. 1. A data repository 216 is illustrated herein as connected to server 214 by virtue of a high-speed datalink. Repository 216 is analogous to repository 29, also of FIG. 1. Repository 216 stores data about subscribers, various systems and appliances maintained by subscribers, and any other data that may be deemed relevant for storage such as original-equipment-manufacturer (OEM) data, and so on.

A plurality of Web servers (WS) 237, 239, and 241 are illustrated within Internet 215 as having connection to backbone 229. Servers 237-241 are adapted as main servers hosted by companies providing various Internet services to subscribers of such services. For example, server 237 may be hosted by a company providing Internet data-search services. Server 239 may be hosted by a company providing Internet shopping services. Server 241 may be hosted by a company providing online investment services. In some embodiments there will be more than one company sharing any one or more of servers 237-241. It may be assumed in this example, that the user of premise 219 and remote location 220 is subscribed to services available from servers 237-241. It may also be assumed in this example that the user of premise 219 and location 220 spends considerable time interacting with electronic information pages contained in each of servers 237-241.

An instance of a distributed control window (DCW) 224 according to an embodiment of the present invention is provided at servers 237-241 associated with one or more information pages, and is displayed on Internet appliance 222. DCW 224 is a software interaction window that is embedded within specific electronic information pages contained within servers 237-241. The instance of DCW 224 illustrated on Internet appliance 222 represents the downloaded and displayed version of DCW 224 at servers 237-241. DCW 224 is a distributed module that enables, in this case, the user operating from location 220 to monitor and make changes to his or her home automated systems or appliances set up at user premise 219. DCW 224 is implemented on information pages at each server location 237,239, and 241 based on a prearranged agreement between a company hosting server 214 and the companies hosting electronic information pages available within servers 237-241. An instance of DCW 224 is embedded within a main Web page subscribed to and frequented by the user operating from remote location 220. In this way, a user may have certain control over his or her home automated systems or appliances without being required to navigate to server 214. In a preferred embodiment, DCW 224 is a java-based program, however other known Internet capable languages may be used to create DCW 224.

There are several means by which DCW 224 may be provided to a third-party. In a preferred embodiment the control window, underlying applications, and the database for users having controllable systems and subscribing to Server 214 are all carried in Server 214. The service is provided to third parties by individual ones of the third party servers becoming an Application Service Provider in an agreement and arrangement with the host of server 214. Access from the third-party site may be such as a hyperlink displayed as an Icon in the third-party window.

In some embodiments of the present invention, in striking an ASP agreement with a third party, the host of server 214 may configure a special edition of applications accessible and operable through the window 224 provided. For example, if the third party is a supplier of hardware components for home automation, in a special edition of services, only the components and systems available from that third party may be represented. In some embodiments of the invention wherein special configurations of services and products may be offered, the host of server 214 may also include one or more banner ads with the DCW provided.

In practice of the present invention server 214 continually monitors the states of S/A devices a-c by virtue of the reporting capability attributed to BS 233. For example, if S/A device a is connected to a lighting system, then a monitored state may reflect, for example, which lights are currently on and which lights are currently off. If S/A device b is connected to a watering system, then a monitored state may reflect, for example, which sectors of a target area are currently being watered and for what periods of time. If S/A device b is connected to an entertainment center, then a monitored state may reflect, for example, whether the system is on or off, scheduled recording times and channel indications for a VCR, and so on.

Typically, a user operating from remote location 220 would use Internet-capable appliance 222 to access server 214 through ISP 221 by virtue of Internet connection lines 231 and 227. Once connected to server 214 the user may then see status of and initiate changes to settings that control S/A devices a-c. The extended functionality provided by virtue of implementing DCW instances 224 enables the user operating from location 220 too view and access control settings while connected to any one of servers 237-241 during normal Internet navigation and interaction with information pages containing an embedded DCW.

Each instance of DCW 224 is personalized to an individual user by virtue of identification of the user through authentication techniques and through identification of an accessing network appliance at the time of page access. Therefore, any accessing user that downloads a page having a DCW embedded therein will be presented data pertaining to his or her own home automated system. The data appears within DCW 224, which is displayed and visible somewhere on the downloaded Web page. By clicking on certain features within the main interaction window of DCW 224, a user may cause other interactive windows to appear enabling the user through further interaction to initiate changes to the settings of his or her home automated systems and/or appliances. Display data as well as initiated changes are communicated between servers 214 and 237-241 over Internet backbone 229.

FIG. 13A is a plan view of an exemplary first display 240 of the distributed control window (DCW) 224 of FIG. 12 according to an embodiment of the present invention. Display 240 is exemplary of what a user might see on a displayed Web page immediately after download. In this example, display 240 may be considered to be open and present somewhere on a displayed Web page such that a user may conveniently glance at current settings. A settings listing 243 illustrates the current states of the user's front lighting system, universal remote control system, and the user's smoke alarm system. In this example, there are three lights, which are indicated as part of the front light system. These are, as illustrated in listing 243, and outdoor light, a hall light, and a living room light. A current state of the three mentioned lights is illustrated as off. Under the universal remote heading and listing 243, it is indicated that the remote is set to channel three and that the control setting is set to stop. Under the heading smoke alarm in listing 243, it is indicated that the smoke alarm is currently off.

In one embodiment, a user may configure as many settings for as many connected systems or appliances as desired. If there are many connected systems and/or appliances, each having several settings options, then a scroll bar may be provided to display 240 to enable scrolling through the headings and associated states presented in listing 243.

IT will be apparent to one with skill in the art that display 240 may be programmed to immediately appear in a convenient location on a downloaded Web page, or alternatively, to be displayed as an icon that may be used to open the window by a user interaction such as a mouse click. Moreover, display 240 is not limited to a text display as illustrated in this example. In one embodiment icons may be used to represent various states of represented systems or appliances, and a variety of other interactive indicia may be used as well. In one embodiment, display 240 may be activated for voice commands and may indicate states of systems or appliances by virtue of synthesized voice technology. There are many variable possibilities.

FIG. 13B is a plan view of a secondary display 242 illustrating change options related to the heading front-light system of display 240 of FIG. 13A. Display 242 may be caused to display resulting from user interaction with the display 240 of FIG. 13A. An example of such an interaction may be double-clicking on front light system within listing 243 of display 240. Listed in display 242 are the state-options for the front-light system of listing 243 of display 240. These options are outdoor light, hall light, and living room light as previously described. Illustrated next to each option is a drop-down menu, which contains the options for each component. In this example, the viable options are simply off and on for each represented light.

In one embodiment, an option for dimming may be present if a dimming function is available in a user's lighting system. Similarly, an auto function may be present for programming the switching features available to the lighting system according to a timing function. There are many possibilities. The variety and selection of options for initiating changes to systems or appliances is limited only by the availability of such features within the actual systems or appliances themselves. In this example, a user has switched the state of each represented light to on as shown in each drop-down menu. A change now button is provided to enable a user to initiate any changes with one mouse click.

FIG. 13C is a plan view of a secondary display 244 illustrating change options related to the header universal remote of listing 243 of display 240 of FIG. 13A. Display 244 may be invoked in the same fashion as described with display 242 of FIG. 13 by simply clicking on the appropriate heading, which in this case, is universal remote. Display 244 shows a channel setting that has been changed to channel 5 from channel 3 illustrated in listing 243 of FIG. 13A. A control setting listed directly below the channel setting has been changed from stop as illustrated in display 240 of FIG. 13A. to record. As described with FIG. 13B above, a change now button is provided for submitting the changed settings. Display 244 may also have a time function provided for enabling a user to select appropriate start times and stop times for the control setting record. In one embodiment, a feature may be included for building natural language commands which may be used immediately or stored an assigned to numbers for later use.

Figure 14:
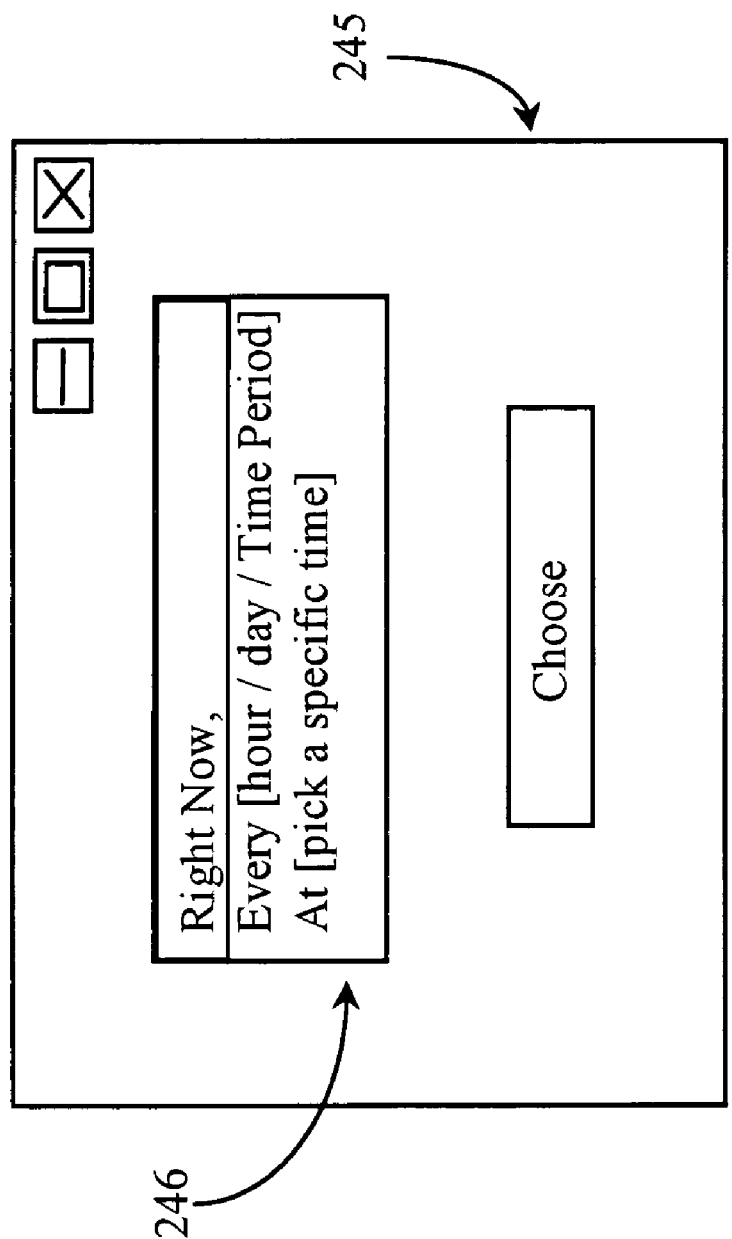
FIG. 14 is a plan view of a command-building function of the distributed control window of FIG. 13A.

FIG. 14 is a plan view of a command-building function 245 according to an embodiment of the present invention. Function 245 may be made available as a utility integrated with DCW 224 of FIG. 12, which may be invoked at the time of display of DCW 224 such has by right clicking on the display, or by some other convenient method. Function 245 appears as an interactive display containing a choice-option box 246 for enabling a user to configure a natural-language command. In this particular example, the choice-options represent parameters of a natural-language command. For example, the choice Right now, would be configured for a command that is to be immediately executed. The choice Every [hour/day/time period] is selected for a repetitive command that will automatically execute on a specific day and at a specific hour, with the affected state running for a specific time period. The choice At [pick a specific time] would be selected for a command that will automatically execute once at a specific time and date in the future. To build a command, a user selects one of the three options provided and then invokes the choose-option button provided below choice-option box 246. A second window (not shown) may be provided in the form of a dialog box for finishing a command.

Figure 15:
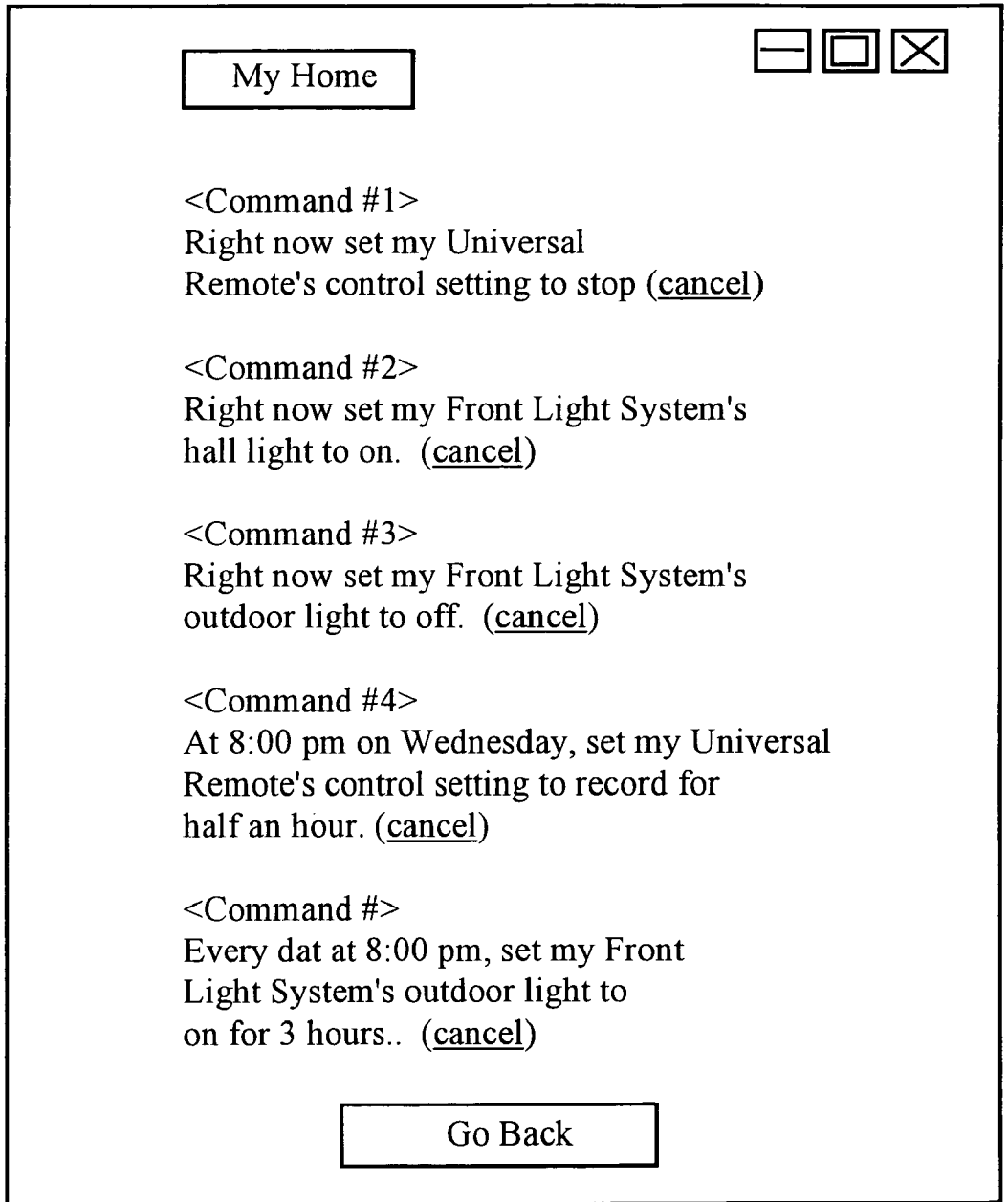
FIG. 15 is a plan view of a secondary display related to the command-building function display of FIG. 14.

FIG. 15 is a plan view of a command list 247 containing a list of commands created with command-building utility 245 of FIG. 14. List 247 contains natural-language commands that are assigned to particular command numbers. For example, a command # 1 is an immediate command for setting a universal remote control to stop. Once a command is created and assigned a number a user may simply invoke the number when executing the command. In this example commands 1-3 are immediate commands such that when executed, effect a system or appliance immediately. A command # 4 is a one-time command for setting a remote control to record at 8:00 p.m. on Wednesday for duration of ½ hour. A last command, illustrated herein as not yet having an assigned number, is a repetitive command that will execute every day at 8.00 PM turning on the outdoor light of a frontlight system on for a period of three hours.

In one embodiment, command list 247 may be an interactive display wherein commands may be finished and command numbers may be assigned. A cancel-option tag on the end of each illustrated command enables a user to cancel or effectively terminate a command and to create and reassign a new command in it's place. In one embodiment of the present invention, natural-language commands may be voice activated using voice to text software to create and assign numbers to each command. In this embodiment, commands may be executed by voice wherein only the command number assigned to the appropriate command is spoken. Likewise, commands may be terminated by selecting the appropriate command in list 247 and speaking the word cancel. There are many possible scenarios.

Commands, which represent active changes in settings and functions of home automated systems or appliances are communicated from respective servers 237-241, from whence they originate, to server 214 whereupon they are sent to the appropriate BS for execution on the targeted systems or appliances.

It will be apparent to one with skill in the art of the method and apparatus of the present invention can be utilized in a number of different ways without departing from the spirit and scope the present invention. For example, instead of a user operating Internet-capable appliance 222 from remote location 220, he or she may instead be operating a mobile communication device such as a cellular telephone with Internet capability. In this case, the cellular telephone may have an LCD or other type of display window for displaying a home page served by proxy server interfacing the cellular phone to various Internet services. Through prearrangement, a DCW 224 may be installed in a personal Web page displayed on the cellular phone upon connection to the Internet. Command building and execution, as well as, simple settings revisions may be performed by utilizing a combination of voice and touchtone input from the cellular keypad.

In still another embodiment of the present invention, a DCW 224 may be provided as a floating interaction-window that follows a user during Internet navigation and is always visible regardless of what server is currently accessed or what electronic information pages are currently being viewed. In this case, DCW 224 would be provided as a browser plug-in such that when a user is navigating the Internet with a particular browser, system and appliance controllability is available.

The method and apparatus of the present invention may be used in conjunction with any data-packet-network that supports Internet protocol. Similarly, the present invention may be practiced using any Internet-connection method known in the art and using a variety of Internet-capable appliances. Therefore method and apparatus the present invention should before the broadest scope possible under examination. The spirit and scope of the present invention is limited only by the claims that follow.

The invention claimed is:

1. An Internet-enabled control system for monitoring and controlling home-automated-systems and appliances at a user's premise, comprising:

a base station with Internet connection at the user's premise, the base station in communication with sensing and actuating subsystems associated with individual ones of the home-automated systems and appliances via radio frequency technology;

a plurality of control units, comprising a wiring interface portion, a RF section comprising a redundancy-based networking protocol, a microcontroller comprising control code, wherein the control units are in communication with the base station via the RF section and in communication with the sensing and actuating subsystems via the wiring interface or the RF section;

a first Internet-connected server, comprising a software-control module for enabling a user to monitor and control home automated systems and appliances, communicating over the Internet with the base station, the first Internet-connected server monitoring the sensing subsystems and providing actuating commands to the actuating subsystems through the base station; such that the control units produce control outputs for a particular home automated-system or appliance in response to input from sensing subsystems associated with the particular home automated-system or appliance and in response to other sensors associated with other home automated-systems or appliances as determined by the software-control module and the control code and wherein the redundancy-based networking protocol comprises a state wherein if one control unit is out of communication range with the base station another control unit intercepts communication on behalf of the out-of range control unit and retransmits to the out-of range control unit.

2. The system of claim 1 further comprising an interactive display at a second Internet-connected server providing a set of services to the user not related to control of the home-automated systems and appliances; and an interactive control interface presentable on the interactive display by the second Internet-connected server, providing a control interface to the user, enabling the user to access settings, view conditions, and issue commands to the home automated systems and appliances over the Internet to the first server and hence to the base station and the systems and appliances themselves wherein the interactive interface comprises a window opened in the interactive display provided by the second server, the window providing information fields and input fields for the user to read conditions at and to provide input to the systems and appliances.

3. The system of claim 2 wherein the set of services provided by the second server comprise one of banking services, search services, security exchange services, or personal data aggregation services.

4. A method for remotely controlling home-automated-systems and appliances at a user's premise, comprising steps of:

providing an interactive display at a first web site, comprising a software-control module for enabling a user to monitor and control home-automated-systems and appliances;

authenticating the user at the web site to activate the interactive display;

establishing Internet communication from the first web site to a base station at the user's premise, the base station in communication with sensing and actuating subsystems associated with individual ones of the home-automated-systems and appliances via radio frequency technology; and communicating with the sensing and actuating subsystems through a plurality of control units, comprising a wiring interface portion, a RF section comprising a redundancy-based networking protocol, an input-output section, and a microcontroller comprising control code, wherein the control units are in communication with the base station via the RF section and in communication with the sensing and actuating subsystems via the wiring interface or the RF section; such that the control units produces control outputs for a particular home-automated-system or appliance in response to input from sensing subsystems associated with the particular home automated-system or appliance and in response to other sensors associated with other home automated-systems or appliances as determined by the software-control module and the control code and wherein the redundancy-based networking protocol comprises a state wherein if one control unit is out of communication range with the base station another control unit intercepts communication on behalf of the out-of range control unit and retransmits to the out-of range control unit.

5. The method of claim 4 wherein the authentication comprises a password.

6. The method of claim 4 wherein the interactive display comprises a window providing information fields and input fields for the user to read conditions at and to provide input to the systems and appliances.

7. An internet-enabled control system for monitoring and controlling home-automated-systems and appliances at a user's premise, comprising:
- an actuating subsystem;
- a sensing subsystem;
- a base station comprising a microcontroller, memory portion, communication port, and a RF communicating section in communication with the sensing and the actuating subsystems associated with individual ones of the home-automated systems and appliances via radio frequency technology;
- a first internet-connected server comprising a software-control module for enabling a user to monitor and control home-automated-systems and appliances communicating with the base station; and
- a plurality of control units comprising a microcontroller comprising control code, an input-output section, a memory portion, a wiring interface portion and a RF communicating section comprising a redundancy-based networking protocol wherein the control units are in communication with the base station via the RF section and in communication with the sensing and actuating subsystems via the wiring interface or the RF section; such that the control units produce control outputs for a particular home automated-system or appliance in response to input from sensing subsystems associated with the particular home automated-system or appliance and in response to other sensors associated with other home automated-systems or appliances as determined by the software-control module and the control code and wherein the redundancy-based networking protocol comprises a state wherein if one control unit is out of communication range with the base station another control unit intercepts communication on behalf of the out-of range control unit and retransmits to the out-of range control unit.

8. The system of claim 7 further comprising an interactive display in communication with said base station providing a set of services via said first Internet-connected server to said user to control said home-automated systems and appliances wherein said first Internet-connected server monitors each control unit and provides actuating commands to each control unit through the base station.

9. The system of claim 8 further comprising
an interactive control interface presentable on the interactive display by said first Internet-connected server, providing a control interface to said user, enabling said user to access settings, view conditions, and issue commands via said base station RF communicating section to each said control unit.

10. The system of claim 9 wherein said interactive interface further comprises a window opened in the interactive display wherein access to additional services comprising at least one of banking services, search services, security exchange services, purchasing services, repair services or personal data aggregation services is provided.

11. The system of claim 10 further comprising access to a second Internet-connected server wherein the second Internet-connected server provides access to at least one of said additional services.

12. An Internet-enabled control system for monitoring and controlling home-automated-systems and appliances at a user's premise, comprising:
- a base station with Internet connection at the user's premise, the base station in communication with sensing subsystems and actuating subsystems at individual ones of the home-automated systems and appliances via radio frequency technology;
- a plurality of control units comprising a wiring interface portion, an input-output section, a microcontroller comprising control code, and a RF communicating section comprising a redundancy-based networking protocol wherein the control units are in communication with the base station via the RF section and in communication with the sensing and actuating subsystems via the wiring interface or the RF section;
- first Internet-connected server communicating over the Internet with the base station, the first Internet-connected server monitoring the sensing subsystems and actuating subsystems and providing actuating commands to the actuating subsystems through the base station;
- an interactive display at the Internet-connected base station providing a set of services to the user related to the control and monitoring of the home-automated systems and appliances; and
- an interactive control interface presentable on the interactive display by the first Internet-connected server, providing a control interface to the user, enabling the user to access settings, view conditions, and issue commands to the home automated systems and appliances over the Internet to the base station and the systems and appliances themselves such that the control units produces control outputs for a particular home automated-system or appliance in response to input from sensing subsystems associated with the particular home automated-system or appliance and in response to other sensors associated with other home automated-systems or appliances as determined by the software-control module and the control code and wherein the redundancy-based networking protocol comprises a state wherein if one control unit is out of communication range with the base station another control unit intercepts communication on behalf of the out-of range control unit and retransmits to the out-of range control unit.

13. The system of claim 12 wherein said interactive display is hosted by a second Internet-connected server providing a set of services to the user related to control of the home-automated systems and appliances; and an interactive control interface presentable on the interactive display by the second Internet-connected server, providing a control interface to the user, enabling the user to access settings, view conditions, and issue commands to the home automated systems and appliances over the Internet to the first Internet-connected server and hence to the base station and the systems and appliances themselves.

14. The system of claim 13 wherein said interactive display is hosted at a second Internet-connected server providing a set of services to the user unrelated to control of the home-automated systems and appliances; and an interactive control interface presentable on the interactive display by the second Internet-connected server, providing a control interface to the user, enabling the user to access settings, view conditions, and issue commands to the home automated systems and appliances over the Internet to the first Internet-connected server and hence to the base station and the systems and appliances themselves.

* * * * *